US006865185B1

(12) United States Patent
Patel et al.

(10) Patent No.: US 6,865,185 B1
(45) Date of Patent: Mar. 8, 2005

(54) METHOD AND SYSTEM FOR QUEUING TRAFFIC IN A WIRELESS COMMUNICATIONS NETWORK

(75) Inventors: Pulin R. Patel, McKinney, TX (US); Achal R. Patel, McKinney, TX (US); Ojas T. Choksi, Plano, TX (US); Mohammad R. Ali, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/513,912

(22) Filed: Feb. 25, 2000

(51) Int. Cl.[7] .......................... H04Q 7/22; H04L 12/56
(52) U.S. Cl. ...................................... 370/412; 370/310
(58) Field of Search ................................. 370/229, 230, 370/231, 232, 233, 234, 235, 310, 332, 395.21, 395.72, 412

(56) References Cited

U.S. PATENT DOCUMENTS

| | | | |
|---|---|---|---|
| 5,257,283 A | 10/1993 | Gilhousen et al. ............. 375/1 |
| 5,293,640 A | 3/1994 | Gunmar et al. ............ 455/33.1 |
| 5,301,359 A | 4/1994 | Van den Heuvel et al. 455/56.1 |
| 5,561,839 A | 10/1996 | Osterberg et al. .......... 455/33.1 |
| 5,603,085 A | 2/1997 | Shedlo ...................... 455/33.1 |
| 5,666,356 A | 9/1997 | Fleming et al. ............. 370/328 |
| 5,734,967 A | 3/1998 | Kotzin et al. ................. 455/63 |
| 5,745,480 A | 4/1998 | Behtash et al. ............. 370/252 |
| 5,768,260 A | 6/1998 | Lindgren et al. ........... 370/252 |
| 5,805,585 A | 9/1998 | Javitt et al. ................. 370/342 |
| 5,862,485 A | 1/1999 | Linneweh, Jr. et al. ..... 455/450 |
| 5,923,650 A | 7/1999 | Chen et al. ................. 370/331 |
| 5,926,458 A * | 7/1999 | Yin ............................. 370/230 |
| 5,987,326 A | 11/1999 | Tiedemann, Jr. et al. ... 455/442 |
| 5,995,805 A | 11/1999 | Ogasawara et al. ........ 455/13.1 |
| 6,021,309 A | 2/2000 | Sherman et al. ........... 455/12.1 |
| 6,070,084 A | 5/2000 | Hamabe ...................... 455/522 |
| 6,151,309 A | 11/2000 | Busuioc et al. ............. 370/328 |
| 6,157,668 A | 12/2000 | Gilhousen et al. .......... 375/130 |
| 6,181,738 B1 | 1/2001 | Chheda et al. .............. 375/224 |
| 6,226,283 B1 | 5/2001 | Neumiller et al. .......... 370/340 |
| 6,289,005 B1 | 9/2001 | Katz .......................... 370/328 |
| 6,304,562 B1 | 10/2001 | Kim et al. ................... 370/332 |
| 6,324,185 B1 | 11/2001 | Budhraja .................... 370/468 |
| 6,327,254 B1 | 12/2001 | Chuah ........................ 370/328 |
| 6,347,224 B1 | 2/2002 | Smyth et al. ............... 455/406 |
| 6,356,759 B1 * | 3/2002 | Mustajarvi .................. 455/450 |

(List continued on next page.)

FOREIGN PATENT DOCUMENTS

| | | | |
|---|---|---|---|
| EP | 0 831 669 A2 | 3/1998 | ........... H04Q/7/38 |
| EP | 0 841 763 A1 | 5/1998 | ........... H04B/7/26 |
| EP | 1 041 850 A1 | 10/2000 | ........... H04Q/7/38 |
| EP | 1096814 A1 * | 2/2001 | ........... H04Q/7/22 |
| WO | WO 98/45966 | 10/1998 | ........... H04B/7/24 |
| WO | WO 98/52288 | 11/1998 | ........... H04B/1/00 |
| WO | WO 99/05828 * | 2/1999 | ........... H04L/12/56 |
| WO | WO 99/48310 * | 9/1999 | ........... H04Q/7/22 |
| WO | WO 99/53630 | 10/1999 | ........... H04B/7/005 |

OTHER PUBLICATIONS

Viswanathan et al. "Soft State Switching draft–viswanathan–mpls–rsvp–00.txt" Internet–Draft. Aug. 1997. pp. 1–13.*

(List continued on next page.)

*Primary Examiner*—Chi Pham
*Assistant Examiner*—Derrick W Ferris
(74) *Attorney, Agent, or Firm*—Baker Botts L.L.P.

(57) ABSTRACT

A method and system for queuing traffic in a wireless network includes receiving a stream of packets for transmission in the wireless network. Each packet includes a flow identifier and is assigned to one of the plurality of virtual groups based on the flow identifier. The virtual groups include discrete transmission resources. Each packet is queued in an assigned virtual group for transmission in the wireless network.

91 Claims, 11 Drawing Sheets

U.S. PATENT DOCUMENTS

| | | | | |
|---|---|---|---|---|
| 6,501,741 B1 | * | 12/2002 | Mikkonen et al. | 370/310 |
| 6,515,972 B1 | * | 2/2003 | Gage et al. | 370/328 |
| 6,587,457 B1 | * | 7/2003 | Mikkonen | 370/356 |
| 6,631,122 B1 | * | 10/2003 | Arunachalam et al. | 370/332 |
| 6,690,679 B1 | * | 2/2004 | Turunen et al. | 370/469 |

OTHER PUBLICATIONS

Davie et al. "Use of Label Switching With RSVP". Network Working Group. Mar. 1998. pp. 1–13.*

Kalliokulju, Juha. "Quality of Service management in $3^{rd}$ generation mobile telecommunication networks". IEEE. Sep. 21, 1999–Sep. 24, 1999. pp. 1283–1287.*

Pang et al. Service Scheduling for General Packet Radio Service Classes. IEEE. Sep. 21, 1999–Sep. 24, 1999. pp. 1229–1233.*

Cheng et al. "QoS Performance Measure and System Design in Wireless ATM". IEEE. Sep. 19, 1999–Sep. 22, 1999. pp. 1745–1749.*

Chawla et al. "Quasi–Static Resource Allocation with Interference Avoidance for Fixed Wireless Systems". IEEE. Mar. 1999. pp. 493–504.*

*Data Networks,* Bertsekas et al., 1987.

"On the Capacity of a Cellular CDMA System," Gilhousen et al., *IEEE* 1991, 10 pages.

"Erlang Capacity of a Power Controlled CDMA System," Viterbi et al., *IEEE* 1993, 9 pages.

B. Bakshi, et al., "Improving Performance of TCP over Wireless Networks," IEEE 17th International Conference on Distributed Computing Systems, 10 pages, May, 1997.

Timothy Ju and Gary Ogasawara, "Congestion Control By Traffic Shaping for Ground/Satellite Network," XP–002140800, Milcom '97 Proceedings, Nov. 2–5, 1997, 5 pages.

U.S. Appl. No. 09/174,273, entitled "Method and Apparatus for Class Based Transmission Control of Data Connections Based on Real–Time External Feedback Estimates Obtained Using Messaging from a Wireless Network," filed Oct. 16, 1998, 35 pages, (062891.0476), Oct. 18, 1998.

S. Biaz and N. Vaidya, "Discriminating Congestion Losses from Wireless Losses using Inter–Arrival Times at the Receiver", IEEE Symposium Application–Specific Systems and Software Engineering Technology (ASSET), 8 pages, Mar., 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug. 1999.

G. Holland and N.H. Vaidya, "Impact of Routing and Link Layers on TCP Performance in Mobile Ad Hoc Networks," IEEE Wireless Communications and Networking Conference (WCNC), 5 pages, Oct. 1999.

U.S. Appl. No. 09/466,308, entitled "Method and System for Allocating Bandwidth in a Wireless Communications Network," filed Dec. 17, 1999, 85 pages, (062891.0475).

U.S. Appl. No. 09/513,914, entitled "Wireless Router and Method for Processing Traffic in a Wireless Communications Network," filed Feb. 25, 2000, 87 pages, (062891.0479).

U.S. Appl. No. 09/513,913, entitled "Method and System for Managing Transmission Resources in a Wireless Communications Network" filed Feb. 25, 2000, 73 pages, (062891.0474).

U.S. Appl. No. 09/513,090, entitled "Method and System for Configuring Wireless Routers and Networks," filed Feb. 25, 2000, 94 pages, (062891.0481).

U.S. Appl. No. 09/513,592, entitled "Method and System for Brokering Bandwidth in a Wireless Communications Network," filed Feb. 25, 2000, 50 pages, (062891.0478).

CA *net II Differentiated Services. Bandwidth Broker System Specification, British Columbia Institute of Technology, Technology Centre, Group for Advanced Information Technology, http://www.interrnet2.edu/qos/gbone/QB BAC.shtml, Online Oct. 4, 1998, XP–002136418, 13 pages, Apr. 25, 2000.

U.S. Appl. No. 09/591,077, entitled "Method and Systems for Dynamic Soft Handoff Resource Allocation in a Wireless Network," filed Jun. 9, 2000, 66 pages, (062891.0473).

U.S. Appl. No. 09/908,225, entitled "Method and System of Integrated Rate Control for a Traffic Flow Across Wireline and Wireless Networks," filed Jul. 18, 2001, 32 pages, (062891.0480).

"TCP and Explicit Congestion Notification," Floyd, Lawrence Berkeley Laboratory, DE–AC03–76SF00098, 16 pages.

* cited by examiner

RULE INFORMATION BASE

| CDMA ~150 | GSM ~152 | TDMA ~154 | IDEN ~156 | LMDS ~158 |
|---|---|---|---|---|
| GEO-LOCATION | GEO-LOCATION | GEO-LOCATION | GEO-LOCATION | HUB LAYOUT |
| GEOGRAPHIC AREA | REUSE FREQUENCY GROUPS | REUSE FREQUENCY GROUPS | REUSE FREQUENCY GROUPS | CHANNEL GROUPS |
| PER ANTENNA BEAM | REUSE CHANNEL GROUPS | REUSE CHANNEL GROUPS | REUSE CHANNEL GROUPS | PER ANTENNA BEAM |
| PER CARRIER PER SECTOR | PER ANTENNA BEAM | PER ANTENNA BEAM | PER ANTENNA BEAM | POINT TO POINT LINKS |
| PER SPREADING SEQUENCE | PER FREQUENCY HOPPING SEQ | RADIO DISTANCES | RADIO DISTANCES | ATMOSPHERIC CONDITIONS |
| PER SOFT HANDOFF REGION | RADIO DISTANCES | CALL STATISTICS | CALL STATISTICS | |
| CALL STATISTICS | CALL STATISTICS | OVERLAY/ UNDERLAY | OVERLAY/ UNDERLAY | |
| SYSTEM QUALITY METRICS | OVERLAY/ UNDERLAY | SPECTRUM SHARING | SPECTRUM SHARING | |
| RADIO DISTANCES | SPECTRUM SHARING | SYSTEM QUALITY METRICS | SYSTEM QUALITY METRICS | |
| | SYSTEM QUALITY METRICS | | | |

*FIG. 8*

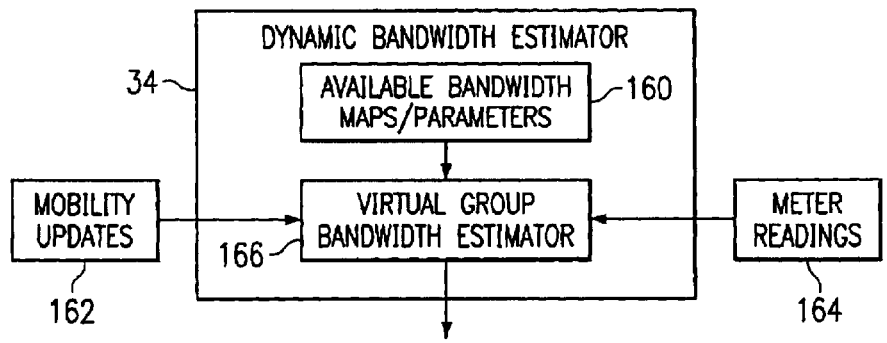

*FIG. 9*

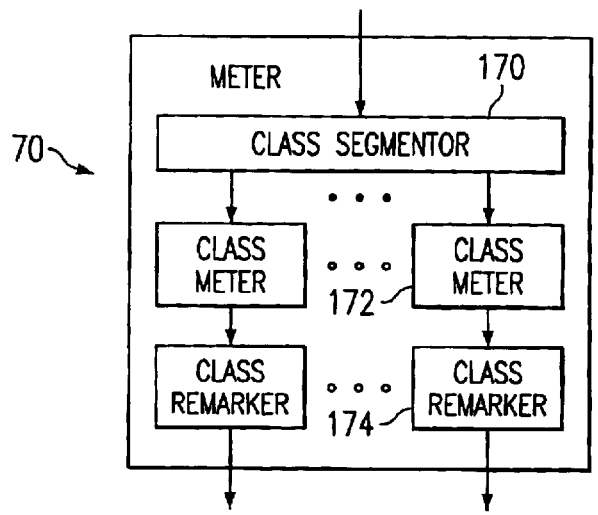
*FIG. 10*
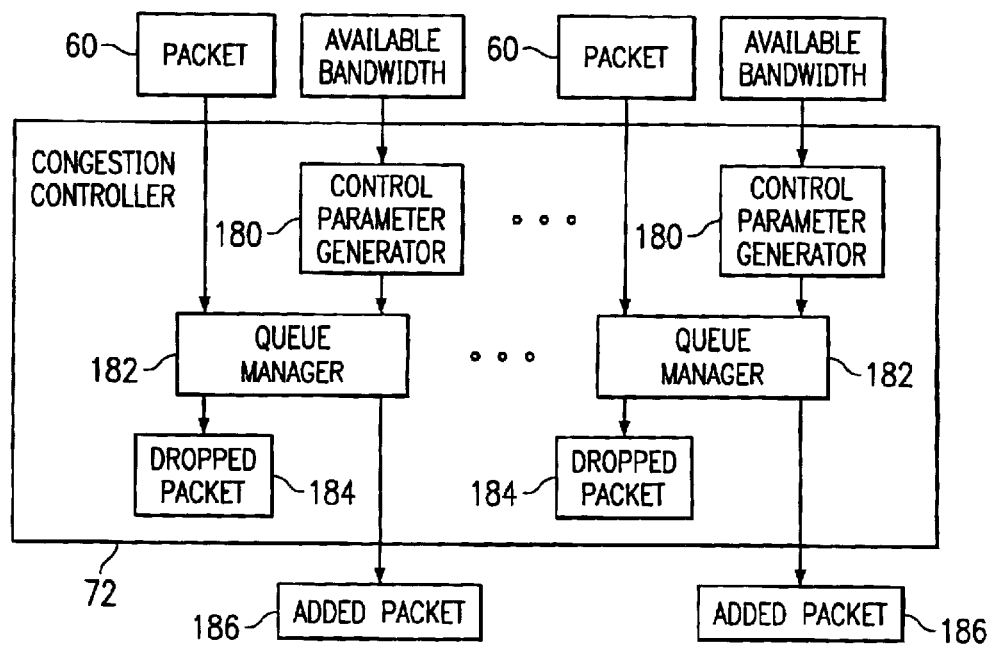
*FIG. 11*
| VG POINTER | CLASS POINTER | PACKET |
|---|---|---|
| VG1 | BEST EFFORT | P5 |
| VG3 | PREMIUM | P4 |
| VG1 | BEST EFFORT | P3 |
| VG3 | BEST EFFORT | P2 |
| VG3 | PREMIUM | P1 |
*FIG. 12*

METHOD AND SYSTEM FOR QUEUING TRAFFIC IN A WIRELESS COMMUNICATIONS NETWORK

RELATED APPLICATIONS

This application is related to U.S. patent application Ser. No. 10/309,393 entitled "Method and System for Managing Transmission Resources in a Wireless Communication Network," U.S. patent application Ser. No. 09/513,592 entitled "Method and System for Brokering Bandwidth in a Wireless Communications Network," U.S. patent application Ser. No. 09/513,914 entitled "Wireless Router and Method for Processing Traffic in a Wireless Communications Network," and U.S. patent application Ser. No. 09/513,090 entitled "Method and System for Configuring Wireless Routers and Networks," all filed on Feb. 25, 2000 and incorporated herein by reference.

TECHNICAL FIELD OF THE INVENTION

The present invention relates generally to the field of wireless communications, and more particularly to a method and system for queuing traffic in a wireless communications network.

BACKGROUND OF THE INVENTION

Wireline and wireless Internet protocol (IP) networks have traditionally supported a best effort delivery of all traffic. To support enhanced services, multiple types, or classes, of services have been established and assigned certain quality of service (QoS) parameters that manage queues for each service type. The QoS parameters include delay, jitter, error rates, and throughput. The QoS parameters can be provisioned on a per IP connection or per flow basis through mechanisms such as resource reservation protocol (RSVP) or can be provisioned on aggregate flow which are classified into service classes. Internet service providers (ISPs) can utilize the service classes, their associated QoS behavior and QoS provisioning to provide tiered service offerings to their business and consumer customers.

The IP QoS architecture provides tools for marking IP flows, controlling and shaping the traffic of various IP flows, and managing various IP queues in order to ensure QoS behavior for each class of service. Queue management algorithms include head-drop, tail-drop, first in first out (FIFO) and random early detect (RED). The queue management may be on individual microflows or on aggregate flows which are treated with similar QoS behavior.

Techniques such as Multiprotocol Label Switching (MPLS) are being developed to combine layer 2 switching and layer 3 routing. MPLS is a unified approach to create a flexible network fabric for increased performance, scalability, and for traffic engineering to enable virtual private networks (VPN) and QoS.

Proposals for IP QoS on wireless networks have focused on combating the error-prone wireless links. For example, ensuring efficient transport control protocol (TCP) performance over an error-prone link as well as renegotiating QoS parameters and reallocating resources as error rates and/or error link performance values degrade. Both MPLS and IP QoS architecture for wireless networks, however, are not sensitive to the mobility, nomadicity (anytime, anywhere), interference, and radio bandwidth characteristics of the air interface. This limits effective application throughput, consistency across the network, overall network efficiency, and rapid service creation.

SUMMARY OF THE INVENTION

The present invention provides an improved method and system for queuing and handling traffic in a wireless communications network that substantially eliminate or reduce problems and disadvantages associated with previous methods and systems. In particular, the present invention organizes Internet protocol (IP) and other data flows into virtual groups for individual treatment, inserts label(s) or tag(s) in front of the data packet identifying the virtual groups, allocates queuing and forwarding resources to the groups, adaptively controls congestion in the groups, and manages mobility of flows between the groups.

In accordance with one embodiment of the present invention, a method and system for queuing traffic in a wireless network comprises receiving a stream of packets as for transmission in the wireless network. Each packet includes a flow identifier and is assigned to one of a plurality of virtual groups based on the flow identifier. Label(s) or tag(s) identifying the virtual group may be inserted in front of each data packet. The virtual groups comprise discrete transmission resources. Each packet is queued in the assigned virtual group for transmission in the wireless network in accordance with transmission resources of the group.

More specifically, in accordance with a particular embodiment of the present invention, forwarding equivalence class (FEC) is created for all flows based on the flow identifier. FEC is determined based on the flow identifier and certain other characteristics of the flow. FEC groups all flows with certain common characteristics. The characteristic may be a location of the flow, a wireless network parameter, a policy parameter for the flow or a flow parameter. The location may be a sector in the wireless network, a latitude and longitude of a mobile device associated with the flow, or a specific beam within a sector of the wireless network. The wireless network parameter may be a sector layout, frequency plan, soft handoff percentage, frequency group, interference estimate, sector power output, or noise threshold in the wireless network. The policy parameter may be a service level agreement, a peak rate, a subscribed rate, a maximum burst rate, a packet size or a delay threshold for the flow. The flow parameter may be a type, a multi-slot indicator, a power level, a burst data rate indicator, or a multi-mode indicator for the flow.

In accordance with another aspect of the present invention, a system and method for controlling congestion within a wireless network include generating dynamic congestion control parameters for a wireless traffic queue based on a status of the wireless network. Excess wireless packets destined for the wireless traffic queue are identified and dropped based on the dynamic control parameters. The remaining wireless packets are added to the wireless traffic queue for transmission. In a particular embodiment, the status of a wireless network is the bandwidth available in the network. The available bandwidth may be in real-time or an average over a specific period of time or may be derived from historical usage data.

In accordance with still another aspect of the present invention, a method and system for queuing traffic in a wireless network include queuing a packet for a corresponding flow in the first location in a first queue. In response to the flow moving from the first location to a second location, the packet is moved from the first queue to a second queue associated with a second location. The packet is requeued in the second queue based on an original queuing time for the packet. In a particular embodiment, the original queuing time may be maintained by storing the packet in a common first in first out (FIFO) memory and providing a queue identifier to identity the specific queue.

Technical advantages of the present invention include providing an improved method and system for queuing IP and other data traffic in a wireless network. In particular, air-link layer is synchronized with upper layer traffic management protocols to improve effective application throughput and consistency across the network. As a result, providers of wireless bandwidth are able to build flexible and scalable cellular network infrastructure and are able to employ dynamic traffic engineering to provide consistent virtual private network (VPN) and Quality of Service (QoS) over the air.

Another technical advantage of the present invention includes providing an improved method and system for organizing flows in a wireless network. In particular, flows are aggregated into groups based on location, radio frequency (RF) interference and/or other characteristics of the flows. This enables individual treatments to be applied to each of the groups and collections of network users to be given the same flow treatment.

Yet another technical advantage of the present invention includes providing an improved method and system for delivering packets in a cell site, sector or other region of a wireless network. In particular, flow locations and RF interference characteristics are utilized to allocate queuing and forwarding resources to flows and to provide congestion management for the flows in the network. Thus, the impact of delivering IP packets into a region is taken into account and conflicts between users are minimized.

Yet another technical advantage of the present invention includes providing a method and system for dynamically organizing flows in a wireless network. In particular, flows are grouped and regrouped into virtual location-specific, RF-specific or other flow aggregates based on changing flow locations, system and flow RF characteristics as well as interference implications. Thus, flow treatments are developed and modified based on location, system and RF character and the interference impact of the flow.

Yet another technical advantage of the present invention includes providing an improved method and system for controlling congestion in a wireless network. In particular, adaptive congestive control is applied to flows and/or groups of flows based on the time-variant availability of bandwidth at various locations in the network. The adaptive congestion control may utilize an increasingly weighty filter when accepting traffic in heavy load conditions and may provide an early control mechanism that prevents indiscriminately penalizing all traffic. As a result, real-time bandwidth management is provided for the wireless network.

Yet another technical advantage of the present invention includes providing improved wireless services. In particular, subscribed QoS is provided to mobile endpoints independent of mobility within a wireless network, load conditions of the network, or the number of user groups being simultaneously served that belong to a common group service. Thus, end-to-end QoS is assured for end-stations and all users are provided with fair treatment during geo-location mobility.

Yet another technical advantage of the present invention includes inserting label(s) or tag(s) in front of each data packet indicating the FEC which is based on the commonality of flow characteristics. Such labels or tags enable the enforcement of QoS treatments and VPN development in a highly scalable, flexible and end-to-end network. Thus, various end-to-end wireless Internet services can be dynamically created, provisioned in the network, and enforced.

Still another technical advantage of the present invention includes providing a method and system for insuring fair treatment of mobile flows across a wireless network. In particular, flows are dynamically grouped and regrouped based on a common time domain to account for source or destination mobility across locations and/or interference domains in the network. Thus, a mobile-flow originating in one location and receiving a particular flow treatment continues to receive the same flow treatment as it transients through the wireless network.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 8 is a data base layout diagram illustrating details of the rule information base of FIG. 2 in accordance with one embodiment of the present invention;

FIG. 9 is a block diagram illustrating details of the dynamic bandwidth estimator of FIG. 2 in accordance with one embodiment of the present invention;

FIG. 10 is a block diagram illustrating details of the virtual group meter of FIG. 2 in accordance with one embodiment of the present invention;

FIG. 11 is a block diagram illustrating details of the virtual group congestion controller of FIG. 2 in accordance with one embodiment of the present invention;

FIG. 12 is a table diagram illustrating details of the queue of FIG. 2 in accordance with one embodiment of the present invention;

DETAILED DESCRIPTION OF THE INVENTION

Figure 1:
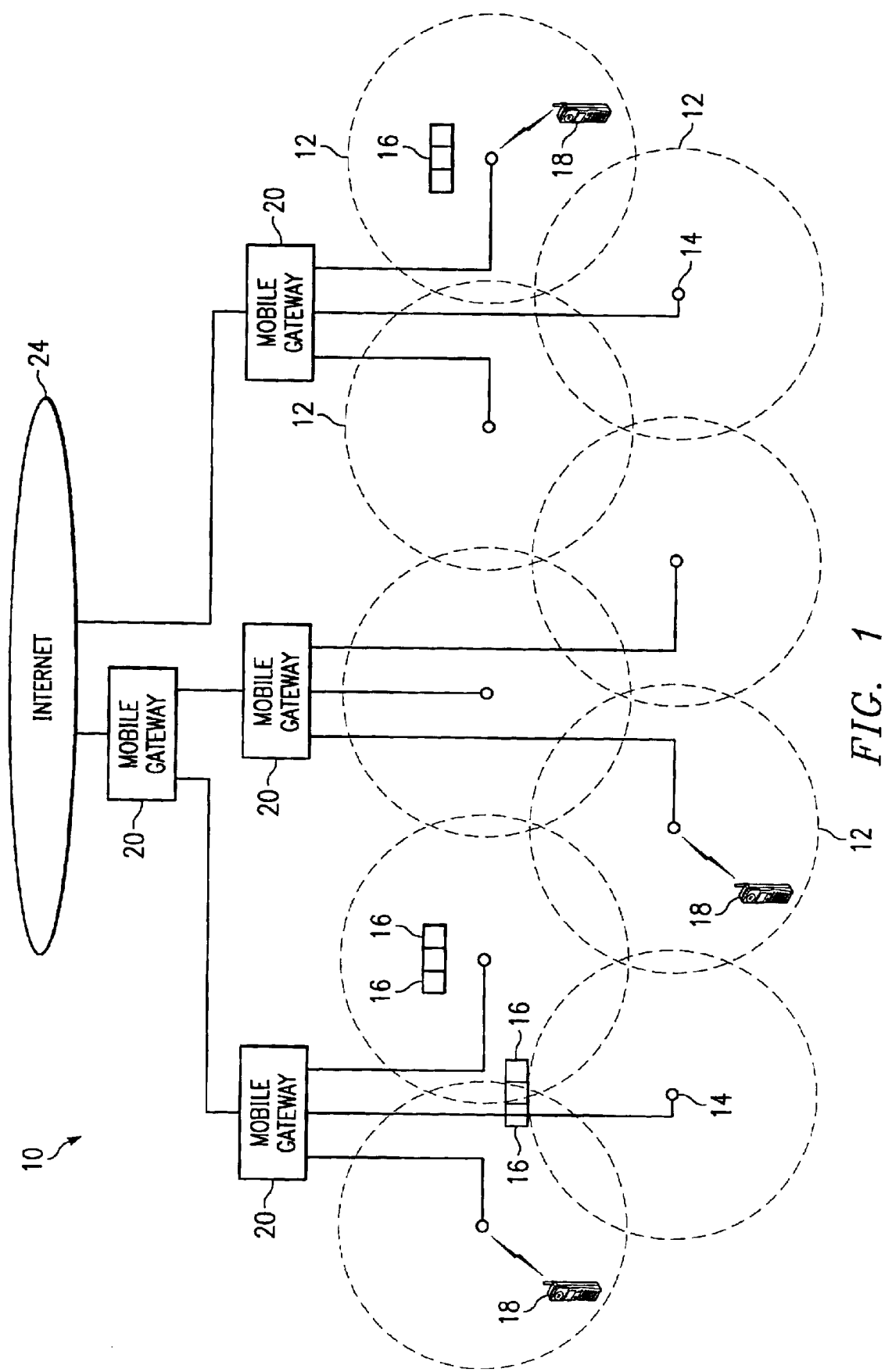
FIG. 1 is a block diagram illustrating a wireless network in accordance with one embodiment of the present invention.

FIG. 1 illustrates a wireless network 10 in accordance with one embodiment of the present invention. In this embodiment, the wireless network 10 is a cellular network in which terrestrial wireless transmission originates in geographically delimited cells. It will be understood that the present invention may be used in connection with satellite and other suitable wireless and other dynamic bandwidth networks in which bandwidth over a link varies over time.

Referring to FIG. 1, the wireless network 10 covers a contiguous area that is broken down into a series of overlapping cells 12. Each cell 12 has a base station, or server, 14 and may be subdivided into a plurality of geo-location areas 16. The geo-location areas 16 are each a defined area in which bandwidth may be allocated to mobile devices. The geo-location areas 16 may have a resolution greater than, less than, or equal to cell size. In a particular embodiment, the geo-location areas 16 are substantially square in shape to form a contiguous grid over the coverage area. Thus, the geo-locations 16 may be shared by one or more cells 12. Further information regarding the geo-locations and allocation of bandwidth in the geo-locations is described in co-owned U.S. patent application Ser. No. 09/466,308, entitled Method and System for Allocating Bandwidth in a Wireless Communications Network, filed Dec. 17, 1999 and incorporated herein by reference.

Each server 14 provides a radio frequency (RF) link for mobile devices 18 within its cell 12. The wireless RF link to the mobile devices 18 in the cell 12 may be based on established standard such as IS-54 (TDMA), IS-95 (CDMA), GMS and AMPS, 802.11 based WLAN, or new upcoming standards such as CDMA 2000 and W-CDMA or proprietary radio interfaces. The mobile devices may be cell phones, data phones, data devices, portable computers, or any other suitable device capable of communicating information over a wireless link.

Due to the nature of the RF airlink, the interference generated by the usage of various mobile devices 18 is inter-dependent. That is, the interference generated by the usage of a mobile device 18 including transmitting and receiving signals is not only dependent on its geo-location, but is also dependent on the geo-location of surrounding mobile devices 18 and the usage of those devices. Thus, the cellular network is an inherently interference-limited network with bandwidth usage in a particular location impacting the interference in specific areas of the neighborhood. In the complete spectrum sharing systems such as CDMA and W-CDMA, bandwidth usage in a particular area directly impacts the bandwidth available at different locations in the neighborhood.

The servers 14 each have a defined bandwidth with which to communicate with the mobile devices 18 in the cells 12. The bandwidth is used by the server 14 and the mobile devices 18 to communicate voice and data information. The supported bandwidth is a function of various factors such as frequency reuse, carrier to interface ratio, bit-energy to noise ratio, effective bit-rate per connection and the like. As described in more detail below, the bandwidth available to allocate to certain flows is geo-location dependent, and time dependent based on current usage of other flows in the geo-neighborhood.

The servers 14 are each connected to a mobile gateway 20 that allocates bandwidth within the wireless network 10, routes traffic, and tracts the location of the mobile devices 18 in the cells 12. The position of a mobile device 18 may be determined using network-assist, global position systems (GPS) and RF fingerprinting. Preferably, the positioning technique provides fast and accurate information with respect to the location of the mobile device 18 to minimize acquisition time for position information. As mobile users move from cell 12 to cell 12, a hand-off operation between base stations 14 is performed by the mobile gateway 20.

The mobile gateway 20 provides connectivity from the wireless portion of the network 10 to a wireline portion 24 of the network 10 via circuit switched and packet switch wireless data protocols. The wireline portion 24 may be the Internet, intranet, extranet, or other suitable local or wide area network. For the Internet, the mobile gateway 20 provides an access, or entry point for all transport control protocol/Internet protocol (TCP/IP) data connections to the wireless portion of the network 10. Each mobile gateway 20 may serve one or more servers 14, includes the RF front end and other functionality of a server 14, and/or via wireless router as described in co-owned U.S. Patent Application entitled "Wireless Router and Method for Processing Traffic in a Wireless Communications Network," previously incorporated by reference. In the later case, the wireless router may be self-configuring as described in co-owned U.S. Patent Application "Method and System for Configuring Wireless Routers and Networks," also previously incorporated by reference. Bandwidth allocation and other functionality of the mobile gateways 20 may instead be implemented by a mobile switching center (MSC), data interworking function (IWF) devices, and other suitable network devices without departing from the scope of the present invention.

As described in more detail below, each mobile gateway 20 organizes flows into one or more virtual groups for transmission within the wireless network 10. Transmission may be from or to the wireless portion of the network 10. The mobile gateways 20 may be arranged in the hierarchical order with a plurality of lower-level or base gateways 20 receiving traffic from servers 14 and passing their traffic to an upper-level or shared gateway. In this way, flows from different locations or having other disparate characteristics can be combined and/or segregated at different levels in the wireless network 10. Virtual group identifiers, including label(s) or tag(s) identifying the virtual group may be passed with the traffic between the mobile gateways 20 to allow high level manipulation of lower level groups. Bandwidth not used by the virtual groups may be brokered by the mobile gateway 20 as described in co-owned U.S. Patent Application entitled "Method and System for Brokering Bandwidth in a Wireless Communications Network," previously incorporated by reference.

The virtual groups may be based on location, location-dependent characteristics, a combination of location and other characteristics of a flow as well as network, policy and call parameters. In a particular embodiment, lower-level virtual groups may be assigned for each cell site 12 to account for the impact of flows at the various locations. The virtual groups may be sized to cover only a portion of the cell site 12, such as a geo-location 16, or a plurality of cell sites 12. Higher-level groups may be composites of lower-level virtual groups from one or more locations.

A forwarding equivalence class (FEC) table may be generated to identify and assign all flows with similar characteristics to a unique label or tag. The characteristics can include flow parameters (such as source/destination address/port), QoS/policy parameters, network parameters, RF interference characteristics call parameters, and location of the end points.

Figure 2:
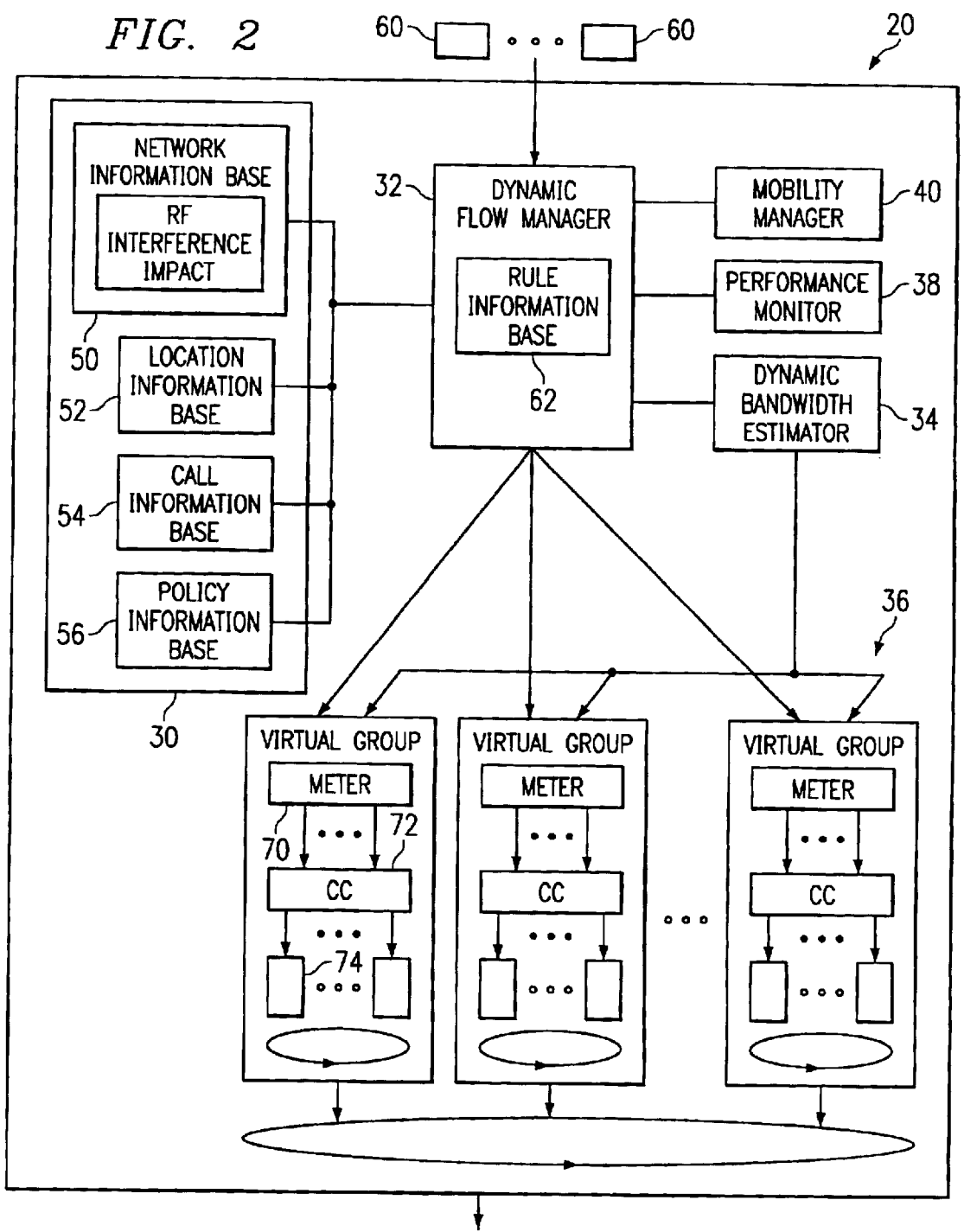
FIG. 2 is a block diagram illustrating details of a mobile gateway of FIG. 1 in accordance with one embodiment of the present invention.

FIG. 2 illustrates details of the mobile gateway in accordance with one embodiment of the present invention. In this embodiment, the mobile gateway 20 includes local information bases and functionality for processing traffic in the wireless network 10. It will be understood that the information bases and functionality of the mobile gateway 20 may be suitably distributed within the wireless network 10 and shared by the mobile gateways 20 or may be provided by external systems of the underlying access network.

Referring to FIG. 2, the mobile gateway 20 includes a set of information bases 30, a dynamic flow manager 32, a dynamic bandwidth estimator 34, a set of virtual groups 36, a performance monitor 38 and a mobility manager 40. The information bases, managers, and virtual groups of the mobile gateway 20 may be implemented in hardware, software stored in a computer-readable medium and/or a combination of hardware and software. The hardware may comprise a field programmable gate array (FPGA) programmed to perform the functionality of the mobile gateway 20, an application specific integrated circuit (ASIC) designed to perform functionality of the mobile gateway 20 and/or a general purpose processor program by software instructions to perform the functionality of the mobile gateway 20.

The information bases 30 include a network information base 50, a location information base 52, a call information base 54 and a policy information base 56. As described in more detail below, the information bases 50, 52, 54 and 56 are used by the dynamic flow manager 32 to uniquely identify each flow and to determine characteristics for the flow. Each of the information bases 50, 52, 54 and 56 may be locally or remotely accessed by the flow manager 32. In addition, one or more of the bases 50, 52, 54 and 56 may be included only in base mobile gateways 20. In this embodiment, the relevant information such as label(s) or tag(s) identifying the virtual group, location, or QoS parameters, may be inserted into the packet header by the base mobile gateway 20 and transmitted in-band with the packet for upstream use by higher-level mobile gateways 20.

The network information base 50 maintains information on source and/or destination networks for flows in the wireless network 10. As described in more detail below, the network information base 50 may store cell site layouts, frequency plans, soft handoff percentages, interference estimates, cell site power outputs, noise floor thresholds and other suitable information describing and/or representing the set up or operation of the network. Further information regarding the network information base 50 is described in more detail below in connection with FIG. 4.

The location information base 52 maintains the location of flows in the wireless network 10. The location may be provided statistically or dynamically. Thus, the location may be a current, projected, and/or estimated geo-location or other location of a uniquely identified flow. The location of the flow may be the location of a source or destination device 18 for the flow, in which case the location of the flow will move between cell sites 12 as the mobile device 18 moves between the cell sites 12. Further information regarding the local information base 52 is described in more detail below in connection with FIG. 5.

The call information base 54 maintains call-specific information for flows in the wireless network 10. As described in more detail below, the call information base 54 may store peak rates, types of calls (voice or data), and service options. Further information regarding the call information base 54 is described in more detail below in connection with FIG. 6.

The policy information base 56 maintains flow-specific class of service policies. In one embodiment, the class of service policies comprise quality of service (QoS) policies. In this embodiment, the policy information base 56 may store peak rates, subscribed rates, maximum burst rates, packet sizes, and delay thresholds. Further information regarding the policy information base 56 is described in more detail below in connection with FIG. 7.

The dynamic flow manager 32 receives an incoming packet stream including a plurality of packets 60 and accesses the network, location, call and policy information bases 50, 52, 54 and 56 to organize the packets 60 into the virtual groups 36. The dynamic flow manager 32 also creates and deletes virtual groups 36 to handle the flows based on the status of the wireless network 10, which may be any suitable operation or flow parameter. In addition, the dynamic flow manager 32 performs the function of filtering high-priority packets that are used to exchange control information for proper functioning of the network 10.

In one embodiment, the dynamic flow manager 32 includes a rule information base 62 governing virtual grouping of flows. The different rules allow the dynamic flow manager 32 to create virtual groups 36 and account for the impact of flows on the network 10 using different access technologies. In a particular embodiment, the dynamic flow manager 32 may identify the type of access network through the call information base 54 and the rules of grouping associated with that type of network from the rule information base 62 and then query the network information base 50 to obtain the access network specific information to route the flow to the appropriate virtual group 36.

The rules of virtual grouping may be statically predetermined for various access technologies or created dynamically based on a real-time current or average status of the underlying network supplying access bandwidth to the end user. In the event of dynamic rule selection, the rule information base 62 is periodically updated using real-time network information from the performance monitor 38 and/or other suitable information feeds. The real-time status of networks may include network loading and/or performance.

The rule information base 62 may be internal to the dynamic flow manager 32, local to the mobile or air gateway 20 or distributed in the wireless network 10 for sharing between the mobile gateways 20. Further information regarding the rule information base 62 is described in more detail below in connection with FIG. 8.

The dynamic bandwidth estimator 34 receives/estimates available bandwidth information for the wireless network 10 and determines available supply (queuing and forwarding resources) for each of the virtual groups 36. Thus, each of the virtual groups 36 may implement independent congestion control. The available bandwidth may be received from external feeds or internally generated based on air resource estimates, pricing strategies, and historical uses. Available bandwidth may be a real-time value or a slow-moving average of currently available bandwidth, past history and future expected usage. In a particular embodiment, the available bandwidth may be provided by available bandwidth maps generated by the mobile gateway 20 as described in co-owned U.S. patent application Ser. No. 09/466,308, entitled "Method and Systems for Allocating Bandwidth in a Wireless Communications Network," filed Dec. 17, 1999. Alternatively, available supply may be determined based on static provisioning per virtual group 36. Further information regarding the dynamic bandwidth estimator 34 is described in more detail below in connection with FIG. 9.

In addition to available bandwidth information, the dynamic bandwidth estimator 34 may utilize information from the dynamic flow manager 32 such as the currently active set of virtual groups 36 and counts of flows in each of the virtual groups 36 to modify and/or optimize the queuing and forwarding resource allocations to the virtual groups 36. The dynamic flow manager 32 also notifies the dynamic bandwidth estimator 34 of dynamic regrouping of flows to enable the interference impact and the congestion parameters for each of the affected virtual groups 36 to be reassessed by the dynamic bandwidth estimator 34. As described in more detail below, the supply estimates are provided by the dynamic bandwidth estimator 34 to each of the virtual groups 36 to allow each virtual group 36 to control its own congestion.

The virtual groups 36 are each an aggregation of flows having one or more similar characteristics. As used herein, each means everyone of at least a subset of the identified items. The virtual groups 36 are each a virtual construct and represent a subset of flows processed by the mobile gateway 20. As described in more detail below, the virtual grouping allows allocation of queuing and forwarding resources to flow combinations. Accordingly, individual treatments can be applied to any suitable set of the flow aggregates.

Each virtual group 36 includes a meter 70, an adaptive congestive controller 72 and one or more class of service queues 74. It will be understood that the virtual groups 36 may comprise other or different components without departing from the scope of the present invention.

The meter 70 meters the flows within the virtual group 36 to identify packets in excess of their flow policies. Such excess packets are remarked (demoted) for congestion control in the virtual group 36. The meter readings are continuously posted to the supply estimator 34 which analyzes the time-dependent demand to adjust supply estimates. Further information regarding the meter 70 is described in more detail below in connection with FIG. 10.

The adaptive congestion controller 72 receives the bandwidth estimates for the virtual group 36 from the dynamic bandwidth estimator 34 and flow policies from the policy information base 56 and then generates congestion control parameters for processing the metered packets. The adaptive congestion controller 72 applies the congestion control parameters to drop excess packets 60 to prevent congestion in the virtual group 36. Thus, all arriving packets are treated to congestion control mechanisms before being placed in the check-out queues 74. The congestion control mechanisms use interference estimates and radio performance estimates to account for the variability in available bandwidth in the wireless network 10. Further information regarding the adaptive congestion controller 72 is described in more detail below in connection with FIG. 11.

The class of service queues 74 include one or more queues for packets 60 in the virtual group 36. In one embodiment, the class of service queues 74 include a premium class queue, an assured class queue, and a best effort queue each associated with a corresponding service. The premium class may be a virtual leased line service. The assured class provides a minimum level of bandwidth guarantee in a variety of traffic conditions. The best effort class is allocated bandwidth on a when-available basis. Transmission resources for each virtual group 36 and class of service queue 74 may be controlled using two and three-dimensional tokens as described in co-owned U.S. Patent Application entitled "Method and System for Managing Transmission Resources in a Wireless Communications Network," previously incorporated by reference.

In order to maintain fairness among flows, packets are checked-out of the queues 74 in a first in first out (FIFO) order. Supply estimates are used to check out packets from the queues 74. Thus, where sufficient bandwidth is available to service the flows present and various class queues 74 in a virtual group 36, the packets 60 are serviced in the order in which they arrived. Similarly, packets output from the different virtual groups 36 are serviced in an order in which they arrive in order to maintain fairness among the groups 36. The available forwarding resources for each virtual group are used to schedule departure packets from the FIFO to assure fair utilization of bandwidth and to assure the proper level of service for all end-stations as per their service level agreements (SLA). Further information regarding the class of service queue 74 is described in more detail below in connection with FIG. 12.

The performance monitor 38 maintains the real-time call performance characteristics for the flows throughout the duration of the flows. The dynamic flow or call information can be collected via an interface to the underlying access network or from an external device. The performance monitor 38 provides the performance information to the call information base 54 and to the dynamic flow manager 32. The dynamic flow manager 32 uses the performance information to transfer flows from one virtual group to another based on defined parameter dependent rules in the rule information base 62.

For IS-95 based access networks, the dynamic call information may comprise performance parameters such as a number of pilots in the active set (soft handoffs), frame error rate, signal to interference ration, received signal strength, load (standby), throughput and the mean packet delay. For GSM/PCS 1900 based access networks, dynamic call information may comprise frequency (ping-pong handoff), signal strength from the serving station, signal to noise ratio, carrier to interference ratio, throughput, mean packet delay, and the mode (emergency, standby or active). For TDMA based access networks, the dynamic call information may comprise frequency of handoff, signal strength, carrier to interference ratio, throughput, mean packet delay. For LMDS based access networks, the dynamic call information may comprise signal strength, carrier to interference ratio, throughput and mean packet delay. It will be understood that these and other types of networks may be monitored for other types of information to allocate queuing and forwarding resources to the virtual groups 36.

The mobility manager 40 moves queued packets 60 from one virtual group 36 to another as mobile devices 18 move in the wireless network 10. As described in more detail below, the mobility manager 40 maintains fairness in allocation of queuing and transmission resources when moving packets 60 between the virtual groups 36. The mobility manger 40 receives an indication of flow movement between virtual groups 36 from the dynamic flow manager 32 and interacts directly with the check-out queues 74.

Figure 3:
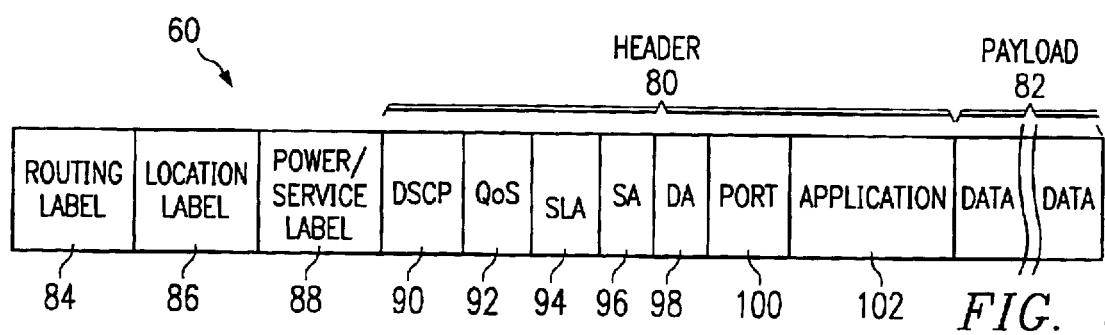
FIG. 3 is a block diagram illustrating an Internet protocol (IP) packet for processing by the mobile gateway of FIG. 2 in accordance with one embodiment of the present invention.

FIG. 3 illustrates a packet 60 in accordance with one embodiment of the present invention. The packet 60 may be an IP or other suitable type of data or voice packet. Referring to FIG. 3 the packet 16 includes a header 80 and a payload 82. The header 80 includes a unique flow identifier by which the flow can be distinguished and organized into a virtual group 36. The payload 82 comprises data.

In one embodiment, the header 80 includes a routing label 84, a location label 86, a power/service option label 88, a Diff-Serv Code Point (DSCP) field 90, a QoS field 92, a SLA field 94, a source address (SA) field 96, a destination address (DA) field 98, a port field 100 and an application field 102. In this embodiment, a tuple comprising the source and destination address, port and application is used to uniquely identify the flow. It will be understood that any other suitable type of identifier of the packet 60 may be used to uniquely identify the flow for the packets 60.

The routing label 84, location label 86, power/service option label 88, DSCP field 90, and QoS field 92 are added by the dynamic flow manager 32 based on flow identity. In a particular embodiment, the dynamic flow manager 32 stores a set of labels for each flow and attaches labels of the set to packets for the flow. The labels may be multi-protocol label switch (MPLS) path labels or other suitable labels capable of identifying a routing path or destination for the packet.

The routing label 84 defines a routing path for the packet to queuing resources. The location label 86 defines the virtual group 36 for the packet. For a hierarchical architecture, a plurality of location labels 86 each identifying successive virtual groups 36 may be provided for the packet. Thus, queuing and other resources may be distributed within the network 10 and the labels used to route the traffic between the distributed components. The power/service option label 88 provides the power level for transmission of the packet and/or service option for the call with which the packet is associated. The service option includes a type of call, a bandwidth for the call or other suitable parameter. It will be understood that separate labels may be used for power and service options. The DSCP and QoS fields 90 and 92 define a class of service for the packet. The DSCP, QoS and SLA fields 90, 92 and 94 are used by the virtual groups 36 for metering, congestion control and queuing. Based on this information and other information obtained in using this information, the packet 60 receives user flow mapping, location mapping, SLA mapping, QoS mapping and flow mapping.

In operation, when a call is established, packets 60 arrive at the mobile-gateway 20 and are identified by the dynamic flow manager 32 based on a unique flow identifier. As previously described, this may be a combination of the source and destination address, port, and application type. The packet 60 is immediately au filtered to ensure that high priority packets such as those that exchange information for the proper functioning of the Internet are not queued. In this case, because the packet is end-station originated, it will be rate-controlled.

Based on the flow identifier, labels are attached to the packet and the dynamic flow manager 32 looks at the caller in its information bases 30 to retrieve all pertinent information to handle the packet 60 efficiently. This information may include the user identifier, location of the call and class of service. Based on the information, the dynamic flow manager 32 classifies the packet 60 into one of the virtual groups 36 for allocation of queuing and forwarding resources. In the assigned virtual group 36, the packet 60 is metered for compliance with subscribed policies and congestion control according to the location, class of service, and/or other suitable parameters. The packet 60, if not dropped, is queued and checked-out as bandwidth becomes available for transmission of the packet 60. In this way, the packet 60 is treated in accordance with its impact on the system.

Figure 4:
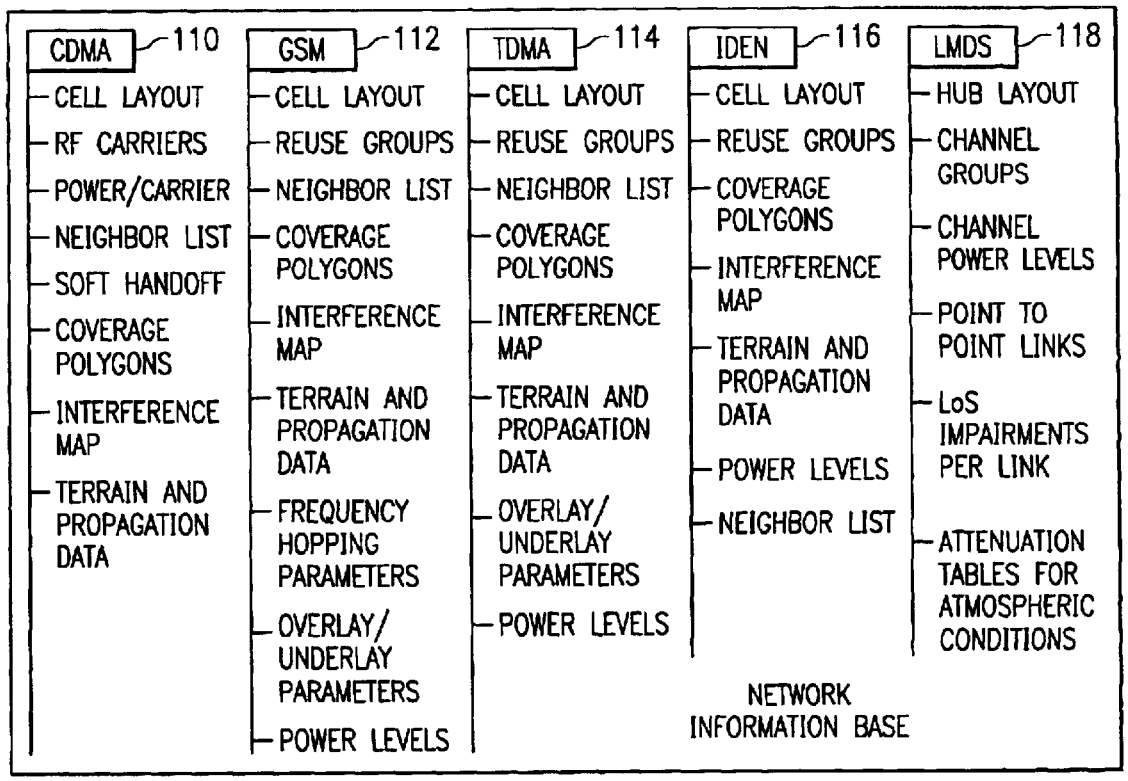
FIG. 4 is a data base layout diagram illustrating details of the network information base of FIG. 2 in accordance with one embodiment of the present invention.

FIG. 4 illustrates details of the network information base 50 in accordance with one embodiment of the present invention. In this embodiment, the network information base 50 includes network parameters for CDMA, GSM, TDMA, IDEM and LMDS wireless technologies. It will be understood that other suitable types of technologies may be similarly mapped in the network information base 50.

Referring to FIG. 4, for CDMA access technology 110, the network information base 50 comprises cell layout, RF carriers, power levels for each carrier at each cell site, neighborhood lists, soft/softer handoff zones, coverage polygons, interference maps, terrain and propagation data on local macro propagation irregularities, associated coverage polygons, and power levels per user. For GSM access technology 112, the network information base 50 comprises cell layout, frequency reuse and co-channel groups based on timeslots or frequencies or combination of frequencies and timeslots, neighborhood lists, local macro propagation irregularities (log normal fading and train irregularities) manifested in form of varying coverage polygons and interference maps, frequency hopping sequences if deployed, and overlay/underlay information. For TDMA access technology 114, the network information base 50 comprises cell layout, reuse groups, neighbor list, coverage polygons, interference maps, terrain and propagation data, overlay/underlay parameters, and power levels. For IDEN access technology 116, the network information base 50 includes cell layout, reuse groups, coverage polygons, interference maps including interference polygons, terrain and propagation data, cell site power levels, and neighborhood lists. For LMDS access technology 118, the local information base 50 includes hub layout, channel groups, hub power levels, point-to-point links, loss of sight (LOS) impairments due to local clutter and its impact, and tables for propagation impairment due to atmosphere conditions such as gases and moisture content in the atmosphere.

Figure 5:
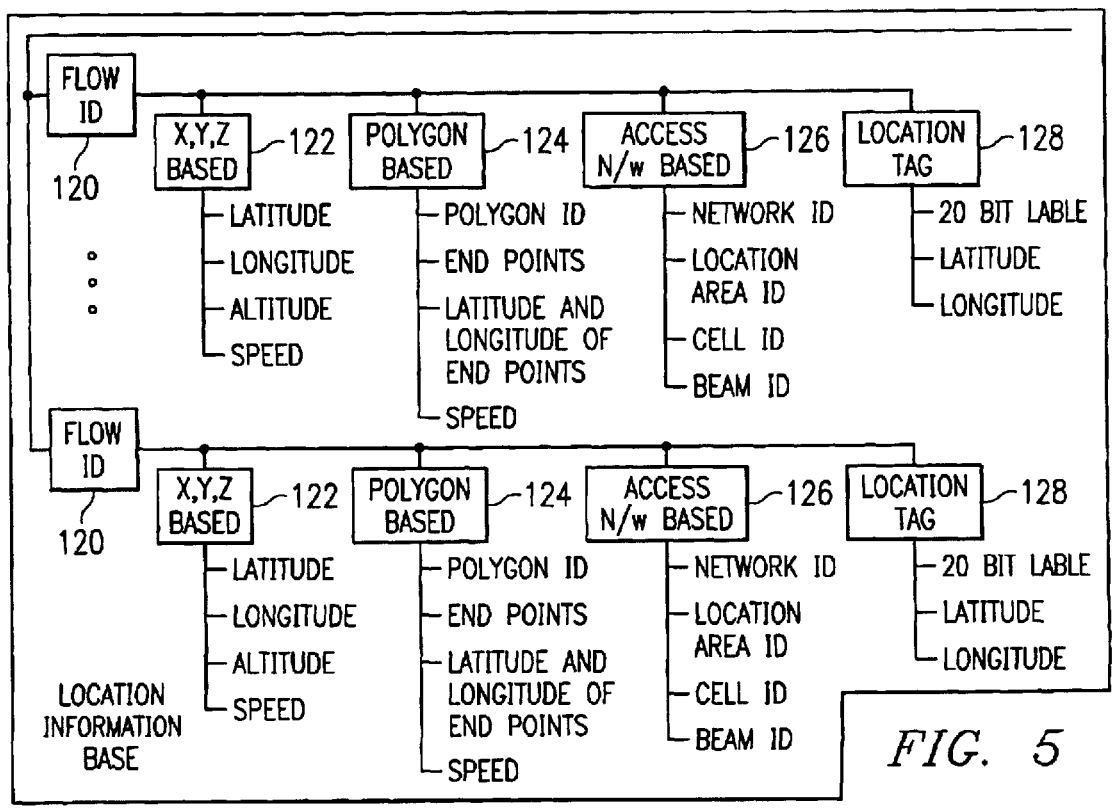
FIG. 5 is a data base layout diagram illustrating details of the location information base of FIG. 2 in accordance with one embodiment of the present invention.

FIG. 5 illustrates details of the location information base 52 in accordance with one embodiment of the present invention. The location information base 52 stores location information of the mobile end-user. The information may be obtained either via an access network or from an external location server that periodically tracts the geo-location of the mobile end-users. The location information is used by the dynamic flow manager 32 and the dynamic bandwidth estimator 34. The dynamic flow manager 32 uses the location information to filter the flows, assign virtual groups to the flows, to select location specific QoS policy, and to determine flow regrouping based on periodic location updates. The location information may also be used to determine a type of access environment such as outdoor, indoor, stationary, or mobile in which the end user is operation and to select a grouping rule for assigning the flow to a virtual group. The granularity of the location information may be varied from a specific location to a specific geographic area to a specific beam-within a cell site of the access network.

Referring to FIG. 5, the location information base 52 stores location information on a per flow identifier 120 basis. The location information for each flow may be XYZ based 122, polygon based 124, access network based 126, or location tag based 128. The XYZ based information 122 includes latitude, longitude, altitude, and speed of the mobile device 18. The polygon based information 124 includes a polygon identifier, end points, latitude and longitude of the end points, and speed of the mobile device 18. The access network based information 126 includes a network identifier, location area identifier, cell identifier, and beam identifier for the mobile device 18. The location tag based information 128 includes a 20 byte label that is based on latitude and longitude of the mobile device 18. In each case, the location information is periodically updated during the duration of a call to allow the dynamic flow manager 32 to determine if the flows need to be regrouped. It will be understood that the location information base 52 may comprise other or different suitable information.

Figure 6:
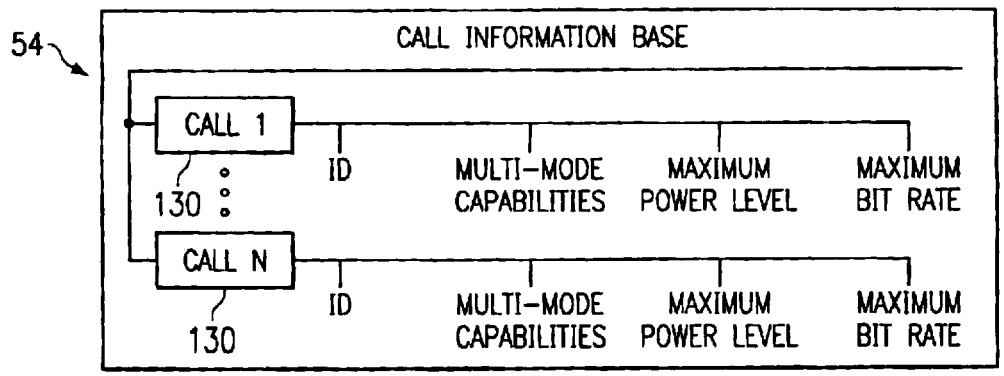
FIG. 6 is a data base layout diagram illustrating details of the call information base of FIG. 2 in accordance with one embodiment of the present invention.

FIG. 6 illustrates details of the call information base 54 in accordance with one embodiment of the present invention. In this embodiment, the call information base 54 maintains static information regarding each call 130 for use by the dynamic flow manager 32. The call information 130 may include a call identifier, multi-mode capability information, maximum power level, and maximum bit rate. The dynamic flow manager 32 uses the call information for routing flows to virtual groups 36. For example, multi-slot operation information in conjunction with the subscribed rate of the call, which is obtained from the QoS subscription, may identify to the dynamic flow manager 32 that a rule defining multi-slot operation is required for routing the flow to a virtual group 36. If multiple access networks with different technologies are available, the multi-mode capabilities allow grouping based on technology-dependent rules that provide the most cost-effective mode of operation to the end user.

Figure 7:
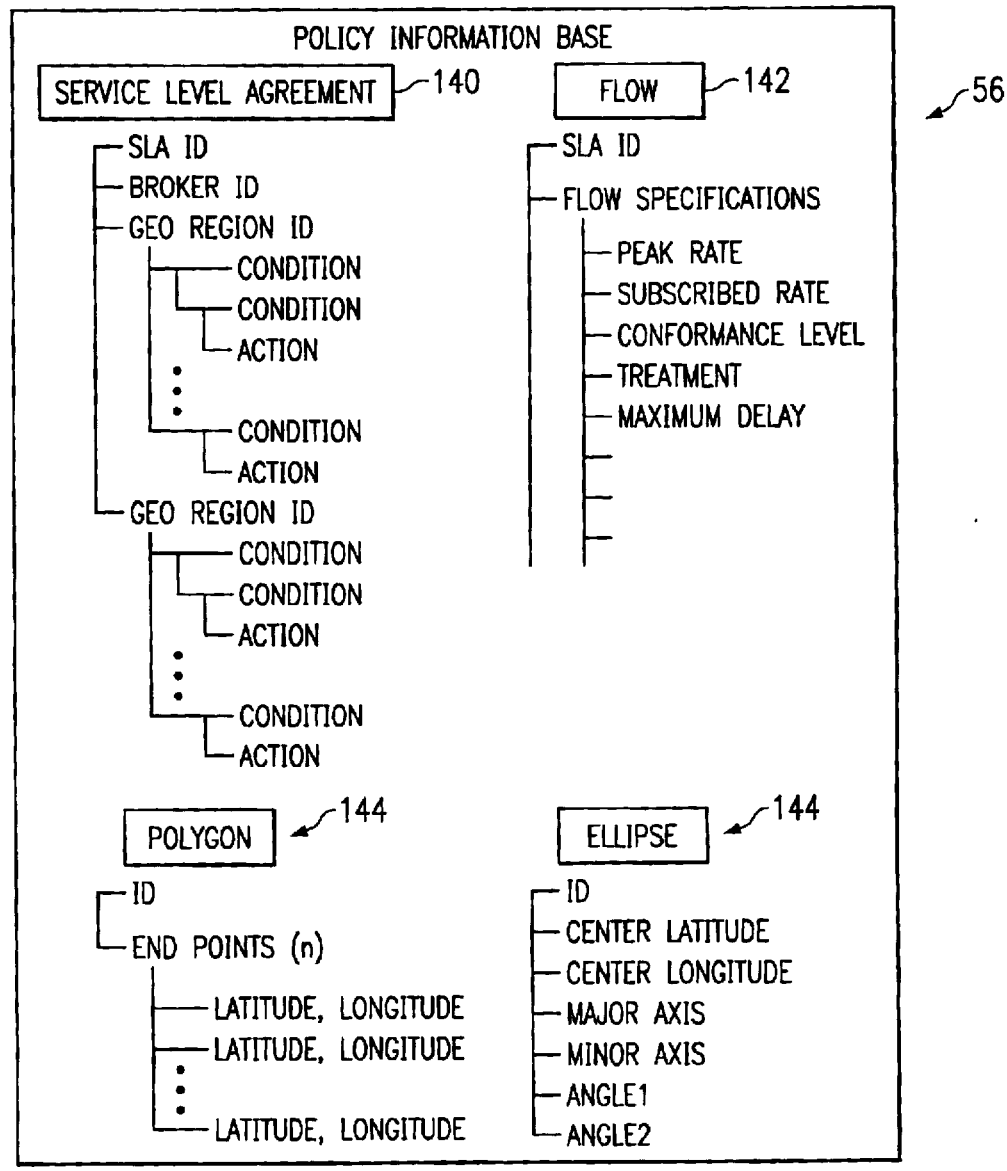
FIG. 7 is a data base layout diagram illustrating details of the policy information base of FIG. 2 in accordance with one embodiment of the present invention.

FIG. 7 illustrates details of the policy information base 56 in accordance with one embodiment of the present invention. The policy information base 56 maintains QoS policies subscribed to by the end user over various geo-location areas and technologies. Thus, an end user may have multiple policies associated with different locations or geographic areas, access networks and services. The end user may also have subscribed policies that vary over time. In addition to QoS policies, the policy information base 56 may also maintain information pertaining to the congestion and policing treatment for a particular flow. The policy information base 56 provides information to the dynamic flow manager 32 for virtual grouping of flows and to the virtual groups 36 for congestion control. In this way, the policy information base 56 acts as a policy manager within the mobile gateway 20.

Referring to FIG. 7, the policy information base 56 includes SLA information 140, flow information 142 and geo region information 144. The SLA information 140 may include a wireless bandwidth broker identifier and location-dependent flow pricing information. The flow information 142 may include a SLA identifier and flow specifications.

The flow specifications include peak rate, subscribed rate, conformance level, treatment, and maximum delay. The geo region information 144 identifies areas within the access network. Such areas may be represented by polygons, ellipses, circles and other suitable shapes. It will be understood that the policy information base 56 may include other or different suitable information for managing service policies in the mobile gateway 20.

FIG. 8 illustrates details of the rules information base 62 in accordance with one embodiment of the present invention. In this embodiment, the rule information base 62 includes rules for CDMA, GSM, TDMA, IDEN, and LMDS wireless technologies. These rules account for the fundamental differences between the technologies and allow virtual groups 36 to be created which accounts for the impact of flows on the network and vice-versa. It will be understood that other suitable types of technologies may be similarly mapped in the rule information base 62.

Referring to FIG. 8, for CDMA technology 150, the rules governing virtual grouping may be based on per antenna beam, per RF carrier, per geographic area, or per spreading sequence. The grouping may also be realized on the basis of soft handoff regions, radio distances, or physical distances from the cell sites. The rules may further be made dependent on real-time call statistics such as call originations, terminations, system loading, and system quality metrics such as call blocks, call drops, flow throughput and mean packet delays. For GSM PCS 1900 technology 152, the rules governing virtual grouping can be based on per antenna beam, per co-channel reuse group, per channel (one or more) slot, or per frequency hopping sequence. The geographic area based on either radio distances or physical distances can also be utilized as a basis of virtual grouping. The rules may also be made dependent on real-time call statistics, system interference and specific network deployment strategies, such as overlay/underlay, spectrum sharing or clearing. For TDMA and IDEN technologies 154 and 156, the rules governing the virtual grouping can be based on per antenna beam, per geographic area, per channel, per co-channel reuse group, radio distances, real-time call statistics and air interference. The rules may also be based on specific network deployment strategies, such as overlay/underlay spectrum sharing, or clearing. For LMDS technology 158, the rules governing the virtual grouping may be based on per hub, per antenna beam, per reuse group or per point-to-point link. The rules may also be dynamically updated based on real-time feeds of the atmospheric conditions affecting the performance of the point-to-point links.

FIG. 9 illustrates details of the dynamic bandwidth estimator 34 in accordance with one embodiment of the present invention. In this embodiment, the dynamic bandwidth estimator 34 receives available bandwidth maps and/or parameters from the performance monitor 38, local information bases 30 or external feeds, mobility updates 162 from the dynamic flow manager 32 and meter readings 164 from the virtual groups 36. This information is fed to a virtual bandwidth group estimator 166 that provides periodic bandwidth estimates to update the congestion control parameters in the virtual groups 36. The update period may be from a few microseconds to a few seconds or other suitable time period and may be dynamic. The bandwidth estimates are used in each virtual group 36 to modify and/or update congestion parameters for the virtual group 36. These dynamic congestion parameters are used to determine the queuing and forwarding resources for each virtual group and to proactively prevent the onset of congestion.

The available bandwidth maps/parameters 160 may include the previously described bandwidth maps and/or historical bandwidth usage, static local access network specific, real-time access network specific, real-time call cross dependence, and pricing strategy parameters. The historical usage parameters may be obtained from the operations log of the access network. The historical data may be organized on a time scale of a month, a day, or a few hours. The usage pattern on special occasions such as a holiday, mother's day, convention, fair and the like may also be provided in the historical usage parameters. The static local access network specific parameters may include the cell layout, number of channels, maximum power levels and the like. The real-time access network specific parameters may include call blocks, call drops, atmospheric conditions, call quality metrics such as packet error rates and interference, system interference, system loading, soft handoff loading, flow throughput and mean packet delays. Atmospheric conditions may be obtained from the performance monitor 38. The real-time call statistics may include originations, terminations, mean holding time, burstiness of calls and handoff overhead. The cross dependence parameters provide interference impact information on flows across several of the virtual groups 36. The pricing strategy parameters may include agreement information between a local access network operator and an end user.

The virtual group bandwidth estimator 166 uses the mobility updates 162 to reassess bandwidth usage, network performance and congestion impact of a mobile device 18 moving from one location to another. The mobile updates are provided by the dynamic flow manager 62 in response to a flow moving from one virtual group 36 to another. An action is in response to an event when it follows at least the event either directly or indirectly. Thus, other events may intervene and/or be necessary for the action to occur. The virtual group bandwidth estimator 166 analyzes the impact of the flow regrouping and recomputes available bandwidth for each virtual group 36 directly and indirectly impacted by flow movement. The meter readings 164 provide the current allocation of forwarding resources for each virtual group 36 and provide a feedback loop to the virtual group bandwidth estimator 166 for tuning time-dependent bandwidth estimates for each virtual group 36.

For a virtual group 36 covering a plurality of locations for which available bandwidth has been determined, the virtual group bandwidth estimator 166 aggregates the bandwidths estimates for the disparate locations to generate a bandwidth for the virtual group 36. Similarly, for virtual groups 36 sharing a location with other virtual groups 36, the virtual group bandwidth estimator 166 determines the portion of the bandwidth for location that is available to each of the virtual groups 36. Thus, the virtual groups 36 may be based on or independent from a particular location or locations.

FIG. 10 illustrates details of the meter 70 in a virtual group 36 in accordance with one embodiment of the present invention. In this embodiment, the meter 70 includes a class segmentor 170 for dividing flows between the various class of services as well as class meter 172 and a class remarker 174 for each class of service in the virtual group 36. The class meter 172 meters each flow to identify packets in excess of flow policies. Such excess packets may be above a peak rate or other suitable subscribed limit. The class remarker 174 remarks excess packets for implementation of congestion control. For example, a premium class packet exceeding the subscribed policies for a flow may be demoted to a best effort packet and dropped to prevent congestion in a virtual group 36 if insufficient bandwidth is available to the virtual group 36 to transmit the packet. It will be understood that the meter 70 may be suitably otherwise implemented in each virtual group 36.

FIG. 11 illustrates details of the adaptive congestion controller 72 in accordance with one embodiment of the present invention. In this embodiment, the congestion controller 72 comprises a control parameter generator 180 and a queue manager 182 for each class of service queue 74 in a virtual group 36. Accordingly, congestion control treatments may be individually applied to each class of service within each virtual group 36.

The control parameter generator 180 receives available bandwidth estimates from the dynamic bandwidth estimator 34 and generates dynamic congestion control parameters for the associated class of service queue 74 based on the bandwidth estimates. The queue manager 182 applies congestion control based on the dynamic congestion control parameters to drop excess packets 184 from the virtual group 36. Remaining packets 186 are added to the class of service queue 74 for transmission in the wireless network. The adaptive congestion control may be applied to packets 60 to be transmitted to the mobile device 18 to control transmission bandwidth to the mobile device 18 or to packets 60 received from the mobile device 18 to control transmission bandwidth of the mobile device 18.

The congestion control mechanism implemented by the queue manager 182 may be individually specified for each class of service in each virtual group 36 and may be random early drop (RED), head-drop, tail-drop or other suitable mechanism capable of adaptively controlling congestion based on dynamic control parameters. In a particular embodiment, the queue manager 182 implements an extended RED algorithm for congestion avoidance in a multiple-queue system with shared buffer space. Shared buffer space for multiple queues is described in more detail below in connection with FIG. 12. In this embodiment, each queue 74 has a reserved minimum bandwidth and each card use additional free buffer space from the shared pool of buffers. This adaptive queue management mechanism enables dynamic linear changes of the minimum and maximum queue thresholds as a function of the amount of congestion over the air link. The congestion over the air link is determined based on supply estimates received from the supply estimator. The queue length in terms of use space is measured and an average queue length is calculated using an expedientially weighted average of previous queue lengths.

In a particular embodiment in which the adaptive congestion controller 72 implements a random early drop (RED) algorithm, the virtual group bandwidth estimator 166 may use a low-pass filter to establish exponential weighted moving averages for each class of service queue 74 in each virtual group 36. In this embodiment, the average computed bandwidth may be calculated as follows:

$$A = (1-g) \times B + g \times b$$

or $$A = B + g \times (b - B)$$

where

A is equal to the average computed bandwidth at time t;
B is equal to the average computed bandwidth at time t−1;
b is equal to the actual bandwidth available at t−1; and
g is equal to the gain of the filter.

In this way, the virtual group bandwidth estimator 166 calculates the estimated supply based on demand up dates and the interference impact of neighboring regions. It will be understood that the bandwidth estimates may be otherwise suitably determined for adaptive congestion control in the virtual groups 36.

FIG. 12 illustrates details of the class of service queues 74 in accordance with one embodiment of the present invention. In this embodiment, the class of service queues 74 for all of the virtual groups 36 are implemented in a common first in first out (FIFO) memory with each packet 190 having an associated virtual group pointer 192 and a class pointer 194. The unique pointers 192 and 194 allow the packets 190 to be moved between the class of service queues 74 and virtual groups while still in a common time domain. Thus, the packets 190 maintain an order based on the original queuing time. As a result, bandwidth weighted fairness is facilitated across the virtual groups 36 and flows within a virtual group 36.

Figure 13:
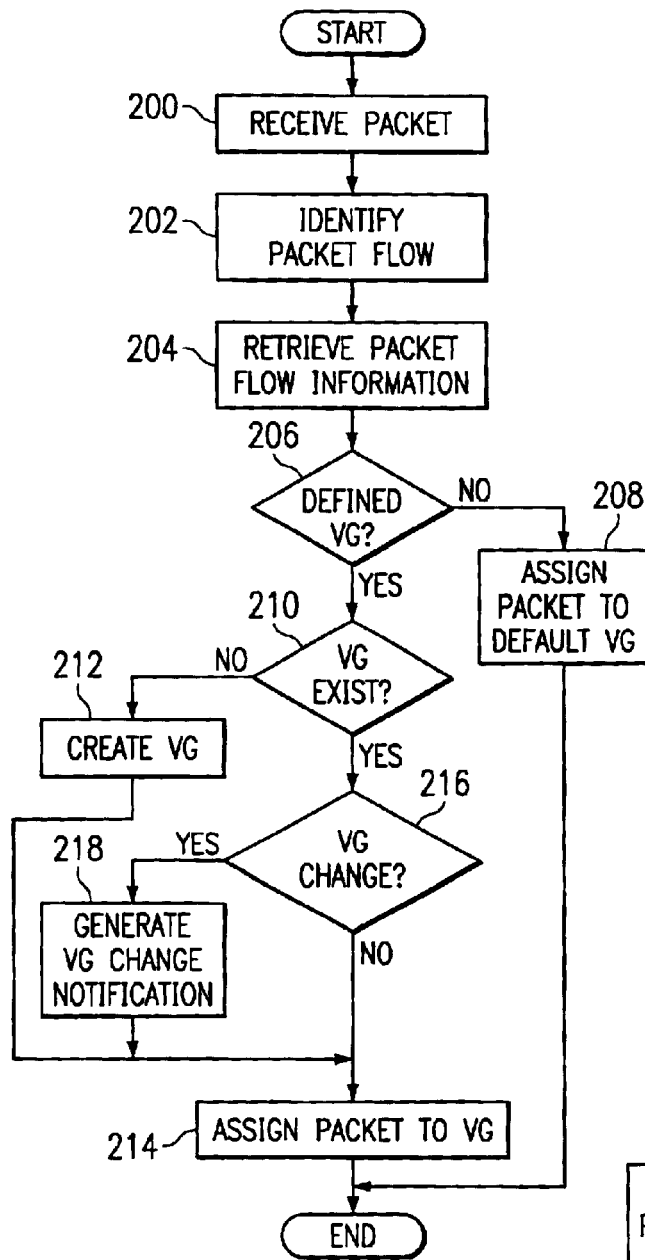
FIG. 13 is a flow diagram illustrating a method for organizing packets into virtual groups of FIG. 2 in accordance with one embodiment of the present invention.

FIG. 13 is a flow diagram illustrating a method for organizing packets 60 into virtual groups 36 in accordance with one embodiment of the present invention. The method begins at step 200 in which a packet 60 is received for transmission in the wireless network 10. Next, at step 202, the packet header 80 is extracted to get the flow identifier and determine the corresponding flow. As previously described, the flow identifier may be a tuple including the source address, destination address, port address, and application type.

Proceeding to step 204, the network information base 50, location information base 52, call information base 54, and/or policy information base 56 are accessed to retrieve information for the packet flow. Next, at decisional step 206, the dynamic flow manager 32 determines if a virtual group 36 is defined for the flow. If no virtual group is defined for the flow, the No branch of decisional step 206 leads to step 208 in which the packet 60 is assigned to a default virtual group 36. This ensures that all packets will be forwarded to a virtual group 36 for allocation of queuing and forwarding resources.

Returning to decisional step 206, if a virtual group 36 is defined for the flow, the Yes branch leads to decisional step 210. At decisional step 210, the dynamic flow manager determines whether the virtual group 36 currently exists in the mobile gateway 20. If the virtual group 36 does not exist, the No branch of decisional step 210 leads to step 212 in which the virtual group 36 is created for handling the flow. Step 212 leads to step 214 in which the packet is assigned to the created virtual group 36. In this way, the dynamic flow manager 32 creates virtual groups 36 and may similarly delete virtual groups 36 no longer in use by a flow in the mobile gateway 20.

Returning to decisional step 210, if a virtual group 36 already exists, the Yes branch proceeds to decisional step 216 in which the dynamic flow manager 32 determines whether the flow location has changed such that the flow has moved from one virtual group 36 to another. If the virtual group 36 has not changed, the No branch of decisional step 216 leads to step 214 in which the packet 60 is assigned to the existing virtual group 36. If the virtual group 36 has changed, the Yes branch of decisional step 216 leads to step 218 in which a virtual group 36 change message is generated to allow queued packets 60 for the virtual group 36 to be moved to the new virtual group 36. Step 218 also leads to step 214 in which the packet 60 is assigned to the new virtual group 36. Labels indicating power level, service/multiplex option, location, SLA DSCP call and the like are added to the packet handler or swapped with the existing labels. Steps 208 and 214 lead to the end of the process by which the packet 60 is organized into a virtual group 36 for allocation of queuing and forwarding resources.

Figure 14:
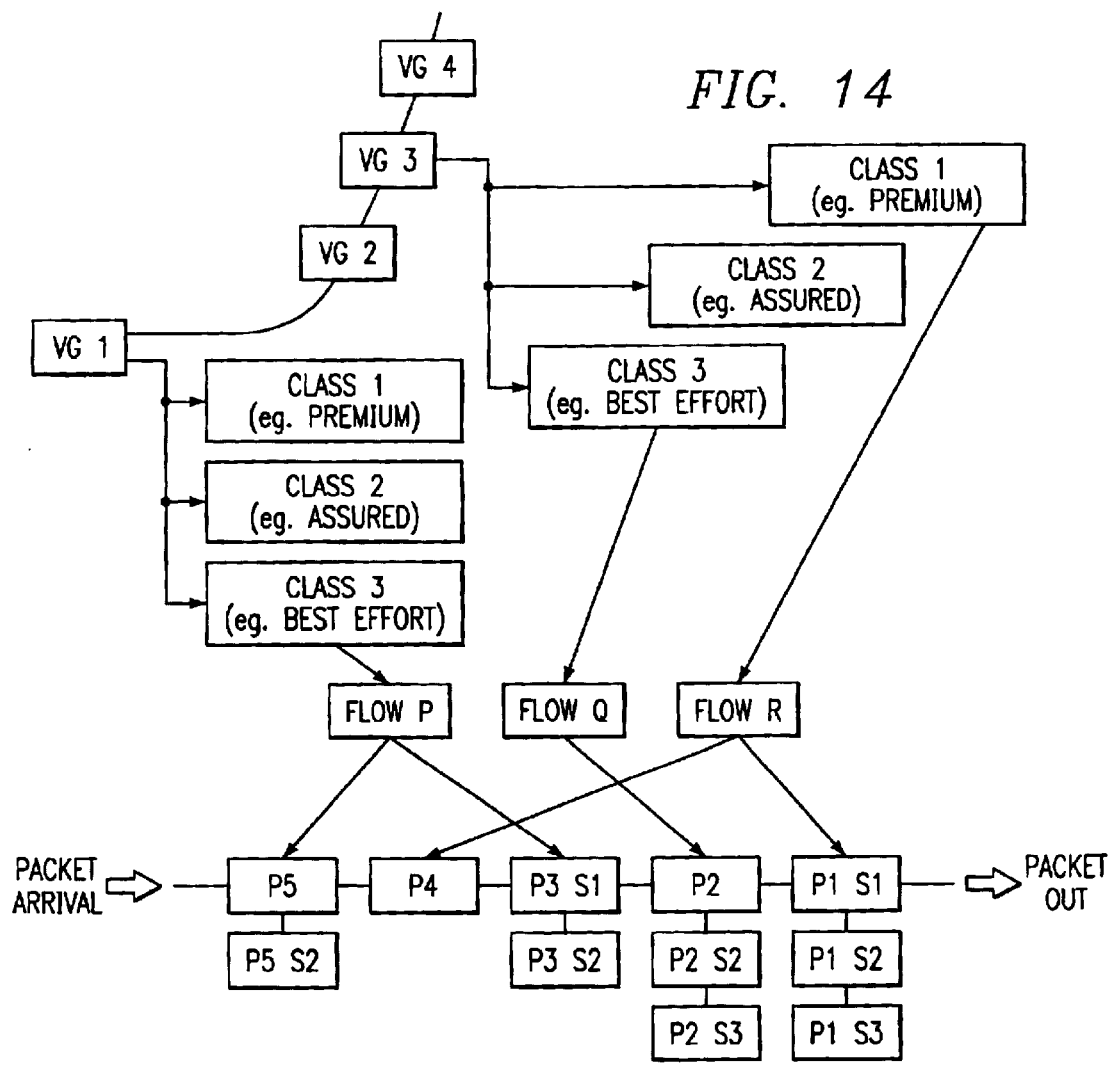
FIG. 14 is a block diagram illustrating assignment of exemplary packets to virtual groups for queuing and transmission in the wireless network in accordance with one embodiment of the present invention.

FIG. 14 illustrates assignment of exemplary packets 60 into virtual groups 36. In the exemplary embodiment, the mobile gateway includes Virtual Groups 1–4 that each have a premium, assured, and best effort queue. The best effort queue in Virtual Group 1 receives Flow P while Virtual Group 3 receives Flow Q and Flow R. Flows P and Q have a best effort QoS while Flow R has a premium QoS. Packets 1–5 arrive and are queued in the shared buffer in their order of arrival. Packets 1 and 4 (P1 and P4) belong to Flow R. Packet 2 (P2) to Flow Q and Packets 3 and 5 (P3 and P5) to Flow P.

There are two ways of checking out the packets 60 upon reception of the available bandwidth updates from the supply estimator 34. The packets 60 can be checked out sequentially by going through each virtual group 36 sequentially or they can be checked out sequentially by going through the shared queue. If the forwarding resources are available to check out all outsending packets in the queue, implementing the first technique will result in the packet checkout order of P3, P5, P1, P2 and P4. The second technique will result in the packet checkout order of P1, P2, P3, P4 and P5. In the event forwarding resources are not available for all queued packets, only those packets which satisfy the bandwidth constraint provided by the supply estimator 34 will be checked out from the queue 74. For example, if available forwarded resources for Virtual Group 1 are two units for best effort packets and available forwarded resources for Virtual Group 3 are two units for premium class packets and zero units for best effort packets, the packet checkout will be P1, P3, P4 and P5. P2 will remain in the queue 74 due to the lack of available bandwidth for best effort packet in Virtual Group 3. However, it will advance to the head of the queue 74 and will be the first to be checked out when the bandwidth for that class in the virtual group becomes available.

Figure 15:
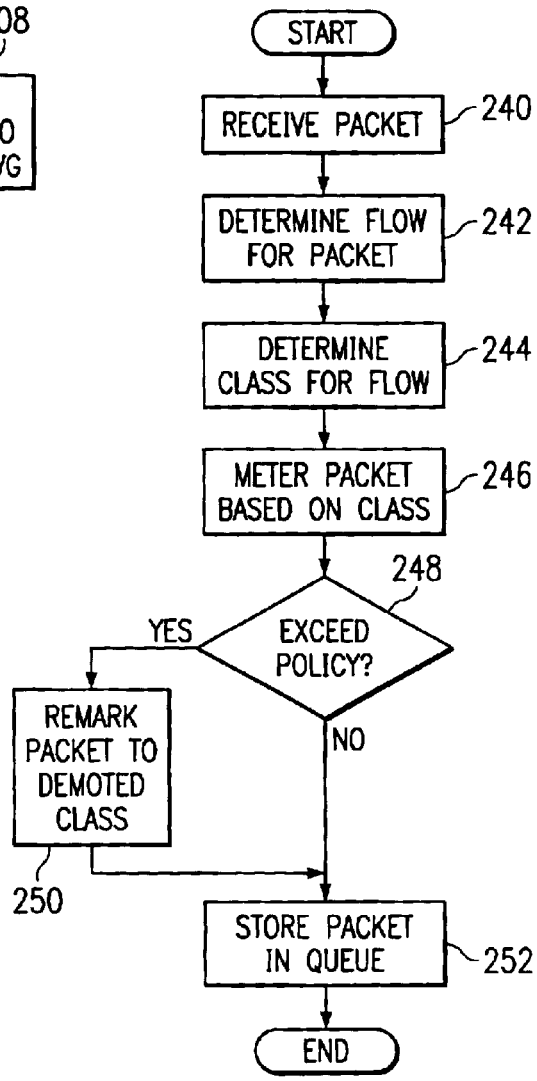
FIG. 15 is a flow diagram illustrating a method for metering and policing flows in a virtual group of FIG. 2 in accordance with one embodiment of the present invention.

FIG. 15 is a flow diagram illustrating a method for metering and policing flows in a virtual group 36 in accordance with one embodiment of the present invention. The metering ensures that individual flows in the various virtual groups 36 are treated and allocated resources in accordance with their Qos subscription and call characteristics. It also ensures fair and equitable distribution of queuing and forwarded resources among flows of a virtual group 36 as per their distinct QoS subscriptions. The metering and placing of the individual flows can be placed on static or dynamic time and space-varying QoS policies and call characteristics of the individual flows.

Referring to FIG. 15, the method begins at step 240 in which a packet 60 is received for transmission in the wireless network 10. Next, at step 242, the flow corresponding to the packet 60 is determined by inspecting the label. At step 244, the class for the flow is determined. In a particular embodiment, the class may be a premium class, an assured class, or a best effort class.

Proceeding to step 246, the packet 60 is metered based on its class to determine whether it exceeds the flow policy. At decisional step 248, if the packet exceeds the policy limitations, the Yes branch leads to step 250 in which the packet 60 is remarked to a reduced class to enable the packet 60 to be dropped if necessary to prevent congestion in the virtual group 36. In this case, the class label is swapped. Step 250 leads to step 252 in which the packet is stored in the demoted class queue 74.

Returning to decisional step 248, if the packet 60 is not in excess of the policy limitations for the flow, the No branch of decisional step 248 leads to step 252 in which the packet 60 is stored in its identified class of service queue 74. Steps 250 and 252 lead to the end of the process by a packet 60 is metered and remarked in anticipation of congestion control. It will be understood that the packet 60 may be otherwise suitably metered as part of the adaptive congestion control.

Figure 16:
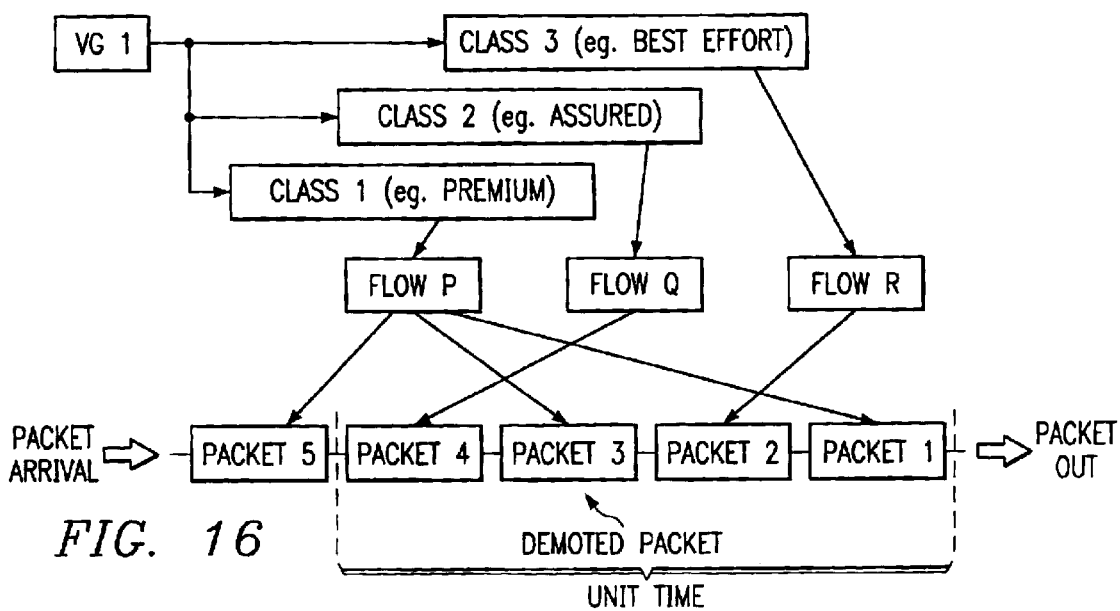
FIG. 16 is a block diagram illustrating metering and policing of exemplary flows in accordance with one embodiment of the present invention.

FIG. 16 illustrates metering and policing of exemplary flows. In the exemplary embodiment, Virtual Group 1 includes Flow P subscribing to a premium class treatment, Flow Q subscribing to assured class treatment, and Flow R subscribing to best effort treatment. Packets 1, 3 and 5 (P1, P3 and P5) are received for Flow P, Packet 2 (P2) for Flow R, and Packet 4 (P4) for Flow Q. If the premium class treatment for Flow P allows the arrival of only one packet per unit time, only P1 and P5 are classified as premium class packets and treated accordingly. P3 is demoted and classified as a best effort packet. P5 arriving in a second unit of time is within the policy limitations and therefore retains its premium class treatment. P2 belonging to Flow R is classified as a best effort packet in accordance with its policy subscription. Similarly, P4 belonging to Flow Q is classified as an assured class packet in accordance with its policy subscription. These packets are then passed to the appropriate congestion controller 72 for dropping of excess packets before forwarding them into the checkout queue and adding the remaining packets to the queue 74 for transmission in accordance with their class.

Figure 17:
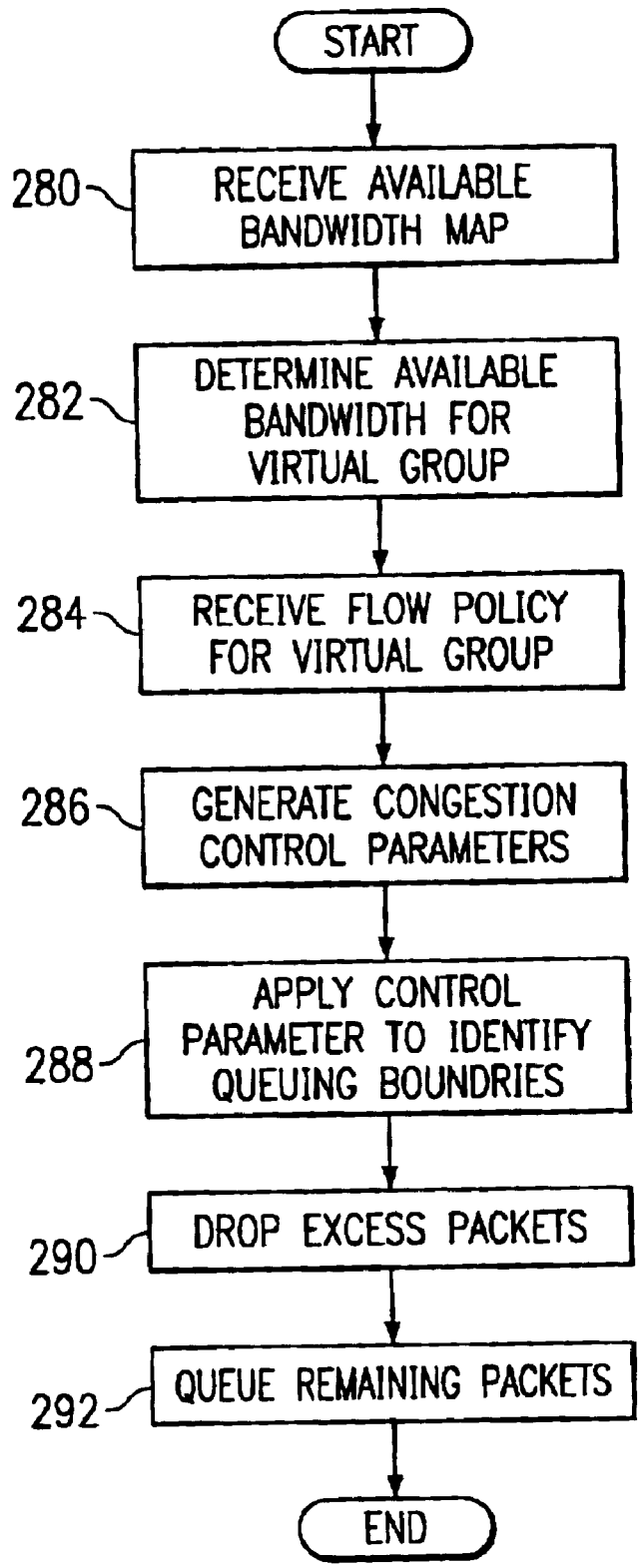
FIG. 17 is a flow diagram illustrating a method for adaptively controlling congestion in a virtual group of FIG. 2 in accordance with one embodiment of the present invention.

FIG. 17 is a flow diagram illustrating a method for adaptively controlling congestion in a virtual group 36 in accordance with one embodiment of the present invention. In the wireless network 10, congestion results when the air bandwidth is depleted. In addition, conditions similar to congestion occur when the air link between the network and the mobile end users degrade due to excessive interference or due to insufficient coverage. Because the air bandwidth in different geo-locations are interdependent, congestion in one area may lead to congestion in another causing a domino congestion effect throughout the network. The adaptive congestion control accounts for the interference to prevent degradation in the air link performance.

Referring to FIG. 17, the method begins at step 280 in which an available bandwidth map is received. The available bandwidth map may be generated as previously described in connection with the bandwidth estimator 34. Next, at step 282, the available bandwidth for a virtual group 36 is determined and provided to the congestion controller 72. At step 284, policy flow information for the virtual group is received by the congestion controller 72 from the policy information base 56.

Proceeding to step 286, congestion control parameters are generated based on the available bandwidth for the virtual group 36. At step 288, the congestion control parameters are applied by the congestion controller 72 to identify the queuing boundaries. For the RED congestion control mechanism, the queuing boundaries may comprise a minimum threshold, a maximum threshold, a maximum probability, and a maximum weight for determining the average queue length.

At step 290 the congestion controller 72 drops excess packets outside the queuing boundaries. For the RED congestion control mechanism, packets below the minimum threshold are never dropped, packets above the maximum threshold are always dropped and packets between the thresholds are dropped based on the probability. At step 292, the remaining packets 60 are queued for transmission in the wireless network 10. Step 290 leads to the end of the process by which congestion control parameters are adapted based on available bandwidth to prevent congestion in the virtual groups 36 and in the mobile gateway 20.

Figure 18:
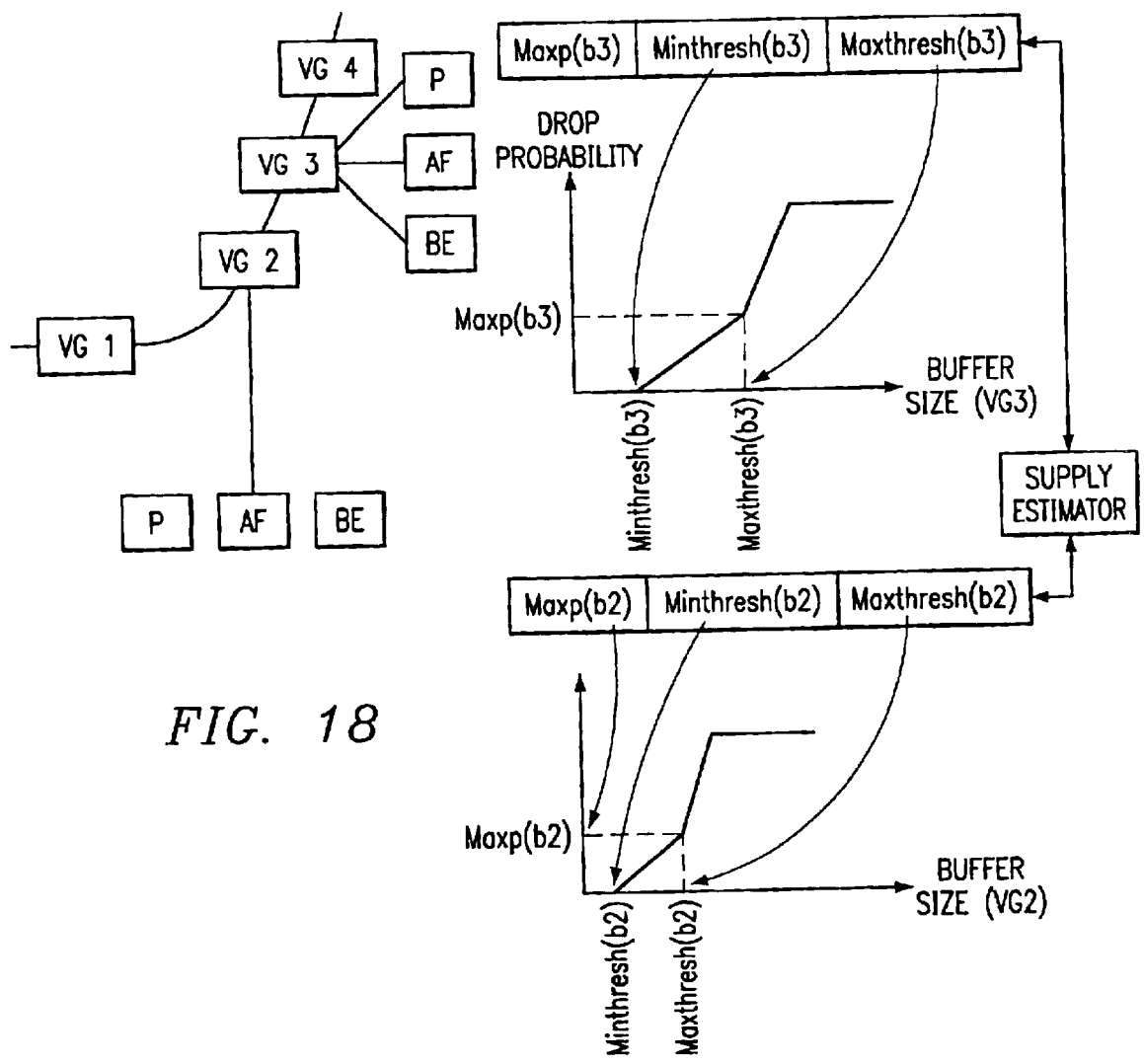
FIG. 18 is a block diagram illustrating congestion control of exemplary flows in accordance with one embodiment of the present invention.

FIG. 18 illustrates congestion control of exemplary flows. In the exemplary embodiment, the mobile gateway 20 includes Virtual Groups 1–4. Virtual Groups 2 and 3 each have a premium, assured and best effort class of service. The call congestion module for the virtual groups 36 utilizes the dynamic supply updates from the supply estimator 34 along with the expected packet arrivals to determine the lower and upper thresholds for congestion control. The average queue length in conjunction with the supply estimates and burstiness of the flows is then used to calculate the packet drop probability.

The policy information such as the class of the flows and their QoS policies is used with the available bandwidth to determine the congestion control parameters. For example, for a real-time call such as voice over IP (VoIP) that is more tolerant to packet drops than packet delays, call congestion parameters may be set to discard packets rather than deliver delayed packets, thereby saving forwarding resources and reducing potential system congestion.

Figure 19:
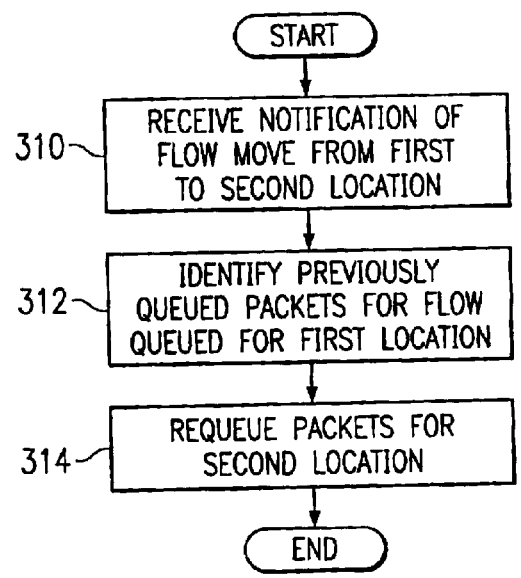
FIG. 19 is a flow diagram illustrating a method for managing flow mobility for the virtual groups of FIG. 2 in accordance with one embodiment of the present invention.

FIG. 19 is a flow diagram illustrating a method for managing flow mobility for the virtual groups 36 in accordance with one embodiment of the present invention. As previously described, the rules governing formation of the virtual groups 36 inside the dynamic flow manager 32 may change dynamically based on real-time updates from the information bases 30 and the performance monitor 38. This may result in the flow being assigned to a virtual group 36 that is different from a current one. The mobility manager 40 moves the queued packets from the old to the new virtual group 36 while maintaining fairness in allocation of forwarding resources to the moved packets.

Referring to FIG. 19, the method begins at step 310 in which the mobility manager 40 receives notification of a flow move from a first location to a second location. As previously described, the notification may be generated by the dynamic flow manager 32 based on real-time call parameters.

Proceeding to step 312, the mobility manager 32 searches the shared queue to identify packets 190 for the flow previously queued in a virtual group 36 associated with the first location. The packets 190 may be identified by the virtual group pointer 192 in the shared queue. Next, at step 314, the packets are requeued into a virtual group 36 for the second location. In the shared-queue embodiment, the packets 190 may be requeued by updating the virtual group pointer 192 from the first virtual group 36 to the second virtual group 36. Thus, the packets 190 maintain the original order and fairness is provided to a flow as it moves through the wireless network. Step 314 leads to the end of the process.

Figure 20:
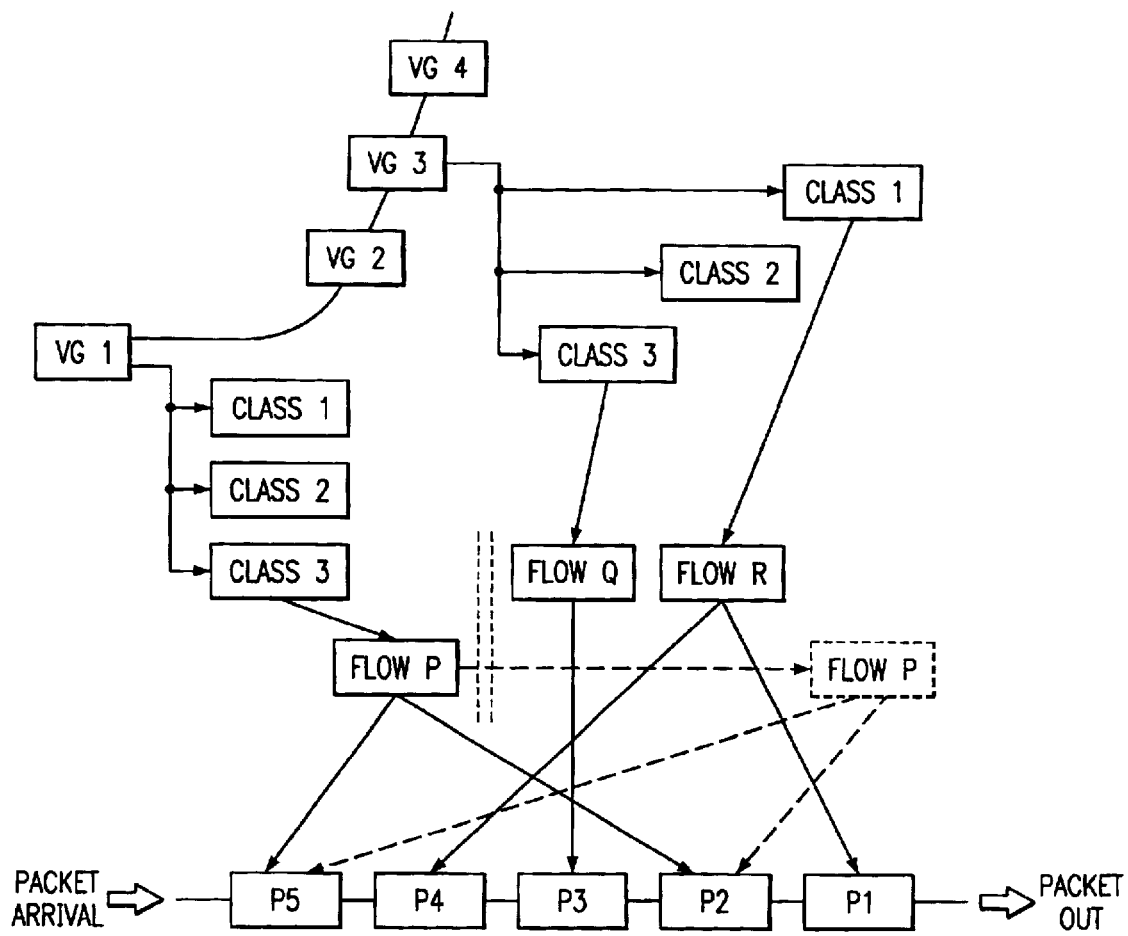
FIG. 20 is a block diagram illustrating mobility management of exemplary flows in accordance with one embodiment of the present invention.

FIG. 20 illustrates mobility management of exemplary flows. In the exemplary embodiment, the mobile gateway 20 includes Virtual Groups 1–4. Virtual Groups 1 and 3 each include three classes of service. Flow P is classified into class 3 of Virtual Group 1, Flow Q into class 3 of Virtual Group 3 and Flow R into class 1 of Virtual Group 3. Flow Q includes queued Packets 1 and 4 (P1 and P4), Flow R includes queued Packet 3 (P3) and Flow P includes queued Packets 2 and 5 (P2 and P5). In response to Flow P moving from Virtual Group 1 to Virtual Group 3, the pointers to P2 and P5 are disassociated from Virtual Group 1 and transfer to Virtual Group 3 while maintaining the class of the packets and their relative position based on their arrival time within the queue with respect to other packets. Thus, for example, if the available forwarding resources are two units for class 1 and one unit for class 3, then P1 and P2 will be checked out. Thus, the available forwarding resources are assigned to packets in the order in which they arrive irrespective of the dynamic regrouping of the flows across the different virtual groups 36. The dynamic bandwidth estimator 34 is notified of the dynamic regrouping to allow it to reassess the interference impact and congestion parameters for each of the affected virtual groups 36.

Figure 21:
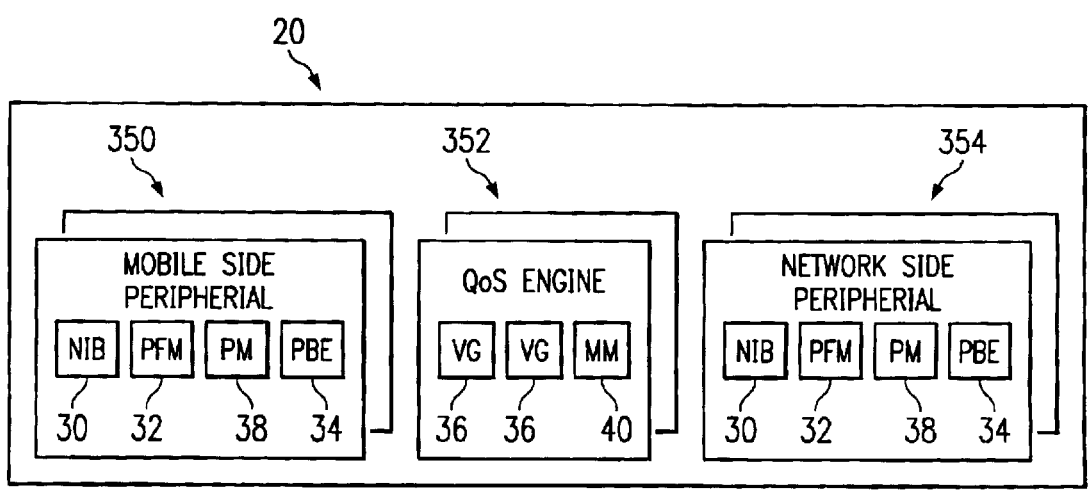
FIG. 21 is a block diagram illustrating details of the mobile gateway of FIG. 2 in a particular embodiment of the present invention.

FIG. 21 illustrates the mobile gateway 20 in accordance with a particular embodiment of the present invention. In this embodiment, the mobile gateway 20 is implemented in a card-shelf configuration with its functionality distributed between discreet cards. The cards are connected by a mesh network, one or more buses, a backplane, or other suitable communication channel.

Referring to FIG. 21, the mobile gateway 20 includes a plurality of mobile side peripherals 350, a plurality of QoS engine cards 352, and a plurality of network side peripherals 354. The mobile side peripherals 350 include the network information base 30, dynamic flow manager 32, performance monitor 38, and dynamic bandwidth estimator 34 for processing and handling traffic received from the wireless portion of the network or different portions of the network. The mobile side peripherals 350 may comprise disparate cards to handle disparate access technologies. The mobile side peripherals 350 may be directly connected to a radio front end and act as a base station or may be connected to a base station, base station controller, or other element in an existing wireless network. The mobile side peripherals 350 add labels to receive traffic for routing and location, power level, and SLA labels for grouping by the QoS engine 352.

The network side peripherals 354 include local information base 30, dynamic flow manager 32, performance monitor 38, and dynamic bandwidth estimator 34 for processing and handling traffic received from the wireline portion of the network. The network side peripherals may include disparate types of cards for connection to disparate wireline formats or different portions of the network. The network side peripherals 354 add routing location, power level, SLA, and grouping labels to receive traffic for use by the QoS engine 352.

The QoS engine 352 comprises the virtual groups 36 including the meter 70, the adaptive congestion controller 72, and the class of service queues 74. Traffic is individually controlled and shaped in each of the virtual groups 36. The QoS engine 352 also includes the mobility manager 40 to move packets between the virtual groups 36 as source and/or destination devices move within the network. As previously described, the mobility manager 40 ensures fairness in treatment of the packets and ensures that packets for a flow from a previous virtual group 36 are handled prior to packets for the same flow queued in the new virtual group 36.

The card-shelf configuration of the mobile gateway 20 provides a scalable architecture within the network 10. In addition, 1+1, 1:N or other protection switching schemes can be implemented in the mobile gateway 20 using protection cards. It will be understood that the mobile gateway 20 may be otherwise suitably implemented.

Although the present invention has been described with several embodiments, various changes and modifications may be suggested to one skilled in the art. It is intended that the present invention encompass such changes and modifications as fall within the scope of the appended claims.

What is claimed is:

1. A method for queuing traffic in a wireless network, comprising:
   receiving a stream of packets for transmission in a wireless network, each packet including a flow identifier uniquely identifying the flow;
   determining for each packet based on the included flow identifier a location for a corresponding flow, the location comprising at least one of a sector in the wireless network, a latitude and a longitude of a mobile device associated with the flow, and a specific beam within a sector of the wireless network;
   assigning each packet to one of a plurality of virtual groups based on the location for the corresponding flow, the virtual groups comprising discrete transmission resources; and
   queuing each packet in an assigned virtual group for transmission in the wireless network.

2. The method of claim 1, further comprising:
   determining for a packet based on the flow identifier a characteristic for the a corresponding flow, the characteristic comprising at least one of a wireless network parameter, a policy parameter for the flow, a flow parameter, and a power level for the flow; and
   assigning the packet to a virtual group based on the location of the flow and the determined characteristic for the flow.

3. The method of claim 2, further comprising inserting a label indicating the virtual group.

4. The method of claim 1, further comprising:
   determining for a packet based on the flow identifier a set of characteristics for a corresponding flow, the set of characteristics comprising the physical location of the flow, a wireless network parameter, a policy parameter for the flow and a flow parameter; and
   assigning the packet to a virtual group based on the set of characteristics for the flow.

5. The method of claim 4, further comprising inserting a label indicating the virtual group.

6. The method of claim 4, the set of characteristics further comprising a power level for the flow.

7. The method of claim 1, further comprising inserting a label indicating the virtual group.

8. The method of claim 1, further comprising:
   determining for a packet based on the flow identifier a wireless network parameter; and
   assigning the packet to a virtual group based on the wireless network parameter.

9. The method of claim 8, further comprising inserting a label indicating the virtual group.

10. The method of claim 8, wherein the wireless network parameter comprises a sector layout.

11. The method of claim 8, wherein the wireless network parameter comprises a frequency plan in the wireless network.

12. The method of claim 8, wherein the wireless network parameter comprises a soft handoff percentage in the wireless network.

13. The method of claim 8, wherein the wireless network parameter comprises an interference estimate in the wireless network.

14. The method of claim 8, wherein the wireless network parameter comprises a sector power output in the wireless network.

15. The method of claim 8, wherein the wireless network parameter comprises a noise threshold in the wireless network.

16. The method of claim 1, further comprising:
   determining for a packet based on the flow identifier a policy parameter for a corresponding flow; and
   assigning the packet to a virtual group based on the policy parameter.

17. The method of claim 16, wherein the policy parameter comprises a service level agreement (SLA) for the flow.

18. The method of claim 16, wherein the policy parameter comprises a peak rate for the flow.

19. The method of claim 16, wherein the policy parameter comprises a subscribed rate for the flow.

20. The method of claim 16, wherein the policy parameter comprises a maximum burst rate for the flow.

21. The method of claim 16, wherein the policy parameter comprises a packet size for the flow.

22. The method of claim 16, wherein the policy parameter comprises a delay threshold for the flow.

23. The method of claim 16, further comprising:
determining for a packet based on the flow identifier a flow parameter for a corresponding flow; and
assigning the packet to a virtual group based on the flow parameter.

24. The method of claim 23, wherein the flow parameter comprises a type of the flow.

25. The method of claim 24, wherein the flow parameter comprises a data flow identifier.

26. The method of claim 23, wherein the flow parameter comprises a multi-slot/multi-code indicator for the flow.

27. The method of claim 23, wherein the flow parameter comprises a power level for the flow.

28. The method of claim 23, wherein the flow parameter comprises a multi-mode indicator for the flow.

29. The method of claim 1, further comprising modifying the existence of virtual groups based on a dynamic status of the wireless network.

30. The method of claim 1, further comprising defining the plurality of virtual groups to account for the impact of flows on the wireless network.

31. The method of claim 1, queuing the packets in the assigned virtual groups comprising queuing the packets in a common memory with a virtual group identifier for each packet.

32. The method of claim 1, the virtual groups including a plurality of class of service queues, further comprising:
determining a class of service for a packet; and
queuing the packet in a corresponding class of service queue in the assigned virtual group.

33. The method of claim 32, queuing the packets in the assigned virtual groups comprising queuing the packets in a common memory with a virtual group identifier and a class of service identifier.

34. The method of claim 32, wherein each class of service queue comprises a first in first out (FIFO) queue.

35. The method of claim 1, further comprising individually metering packets in a virtual group to demote packets in excess of corresponding flow policies.

36. The method of claim 1, further comprising dynamically controlling congestion in a virtual group based on available bandwidth for the virtual group in the wireless network.

37. The method of claim 1, further comprising:
receiving an indication of available bandwidth for a virtual group;
generating congestion control parameters for the virtual group based on the indication of available bandwidth; and
dropping packets from flows in the virtual group based on the congestion control parameters.

38. The method of claim 37, further comprising generating the indication of available bandwidth based on air-resource estimates.

39. The method of claim 37, further comprising generating the indication of available bandwidth based on pricing strategy information.

40. The method of claim 37, further comprising generating the indication of available bandwidth based on historical usage information.

41. The method of claim 1, at least one virtual group including a plurality of class of service queues, further comprising individually controlling congestion for each of the class of service queues in the virtual group based on a dynamic status of the wireless network.

42. The method of claim 1, further comprising:
assigning a packet for a corresponding flow in a first location to a first virtual group associated with the first location; and
in response to the flow device moving from the first location to a second location, assigning a subsequent packet for the flow to a second virtual group associated with the second location.

43. The method of claim 42, further comprising requeuing the packet in the first virtual group into the second virtual group based on an original queuing time for the packet.

44. A system for queuing traffic in a wireless network, comprising:
a dynamic flow manager operable to receive a stream of packets for transmission in a wireless network, each packet including a flow identifier uniquely identifying the flow, to determine for each packet based on the included flow identifier a location for a corresponding flow, wherein the location comprises at least one of a sector in the wireless network, a latitude and a longitude of a mobile device associated with the flow, and a specific beam within a sector of the wireless network, and to assign each packet to one of a plurality of virtual groups based on the location for the corresponding flow; and
the virtual groups comprising discrete transmission resources each operable to queue assigned packets for transmission in the wireless network.

45. The system of claim 44, the dynamic flow manager further operable to determine for a packet based on the flow identifier a characteristic for a the corresponding flow, the characteristic comprising at least one of a location of the flow, a wireless network parameter, a policy parameter for the flow, a flow parameter, and a power level for the flow, and to assign the packet to a virtual group based on the location of the flow and the determined characteristic for the flow.

46. The system of claim 45, the dynamic flow manager further operable to insert a label indicating the virtual group.

47. The system of claim 44, the dynamic flow manager further operable to determine for a packet based on a flow identifier a set of characteristics for a corresponding flow, the set of characteristics comprising the physical location of the flow, a wireless network parameter, a policy parameter for the flow, and a flow parameter, and to assign the packet to a virtual group based on the set of characteristics for the flow.

48. The system of claim 47, the dynamic flow manager further operable to insert a label indicating the virtual group.

49. The system of claim 47, the set of characteristics comprising a power level for the flow.

50. The system of claim 44, the dynamic flow manager further operable to insert a label indicating the virtual group.

51. The system of claim 44, further comprising software stored on a computer-readable medium, the software comprising the dynamic flow manager and operable to implement the virtual groups.

52. The system of claim 44, further comprising a preconfigured processor operable to implement the dynamic flow manager and the virtual groups.

53. The system of claim 44, the dynamic flow manager further operable to determine for a packet based on the flow identifier a wireless network parameter and to assign the packet to a virtual group based on the wireless network parameter.

54. The system of claim 53, the dynamic flow manager further operable to insert a label indicating the virtual group.

55. The system of claim 53, wherein the wireless network parameter comprises a sector layout.

56. The system of claim 53, wherein the wireless network parameter comprises one of a frequency plan and a frequency group in the wireless network.

57. The system of claim 53, wherein the wireless network parameter comprises one of a soft handoff percentage and a soft handoff region in the wireless network.

58. The system of claim 53, wherein the wireless network parameter comprises an interference estimate in the wireless network.

59. The system of claim 53, wherein the wireless network parameter comprises a sector power output in the wireless network.

60. The system of claim 53, wherein the wireless network parameter comprises a noise threshold in the wireless network.

61. The system of claim 44, the dynamic flow manager further operable to determine for a packet based on the flow identifier a policy parameter for a corresponding flow and to assign the packet to a virtual group based on the policy parameter.

62. The system of claim 61, wherein the policy parameter comprises a service level agreement (SLA) for the flow.

63. The system of claim 61, wherein the policy parameter comprises a peak rate for the flow.

64. The system of claim 61, wherein the policy parameter comprises a subscribed rate for the flow.

65. The system of claim 61, wherein the policy parameter comprises a maximum burst rate for the flow.

66. The system of claim 61, wherein the policy parameter comprises a packet size for the flow.

67. The system of claim 61, wherein the policy parameter comprises a delay threshold for the flow.

68. The system of claim 44, the dynamic flow manager further operable to determine for a packet based on the flow identifier a flow parameter for a corresponding flow and to assign the packet to a virtual group based on the flow parameter.

69. The system of claim 68, wherein the flow parameter comprises a type of the flow.

70. The system of claim 68, wherein the flow parameter comprises a data flow identifier.

71. The system of claim 68, wherein the flow parameter comprises a multi-slot/multi-mode for the flow.

72. The system of claim 68, wherein the flow parameter comprises a power level for the flow.

73. The system of claim 68, wherein the flow parameter comprises a multi-mode indicator for the flow.

74. The system of claim 44, the dynamic flow manager further operable to modify the existence of virtual groups based on a dynamic status of the wireless network.

75. The system of claim 44, the dynamic flow manager further operable to define the plurality of virtual groups to account for the impact of flows on the wireless network.

76. The system of claim 44, the virtual groups operable to queue the packets in assigned virtual groups by queuing the packets in a common memory with a virtual group identifier for each packet.

77. The system of claim 44, the virtual groups including a plurality of class of service queues, the virtual groups further operable to determine a class of service for a packet and to queue the packet in a corresponding class of service queue in the assigned virtual group.

78. The system of claim 77, the virtual groups further operable to queue the packets in the assigned virtual groups by queuing the packets in a common memory with a virtual group identifier and a class of service identifier.

79. The system of claim 77, wherein each class of service queue comprises a first in first out (FIFO) queue.

80. The system of claim 44, the virtual groups operable to individually meter packets and to demote packets in excess of corresponding flow policies.

81. The system of claim 44, each virtual group operable to dynamically control congestion in the virtual group based on available bandwidth for the virtual group in the wireless network.

82. The system of claim 44, each virtual group operable to receive an indication of available bandwidth for the virtual group, to generate congestion control parameters for the virtual group based on the indication of available bandwidth and to drop packets from flows in the virtual group based on the congestion control parameters.

83. The system of claim 82, further comprising a dynamic bandwidth estimator operable to generate the indication of available bandwidth based on air-resource estimates.

84. The system of claim 82, further comprising a dynamic bandwidth estimator operable to generate the indication of available bandwidth based on pricing strategy information.

85. The system of claim 82, further comprising a dynamic bandwidth estimator operable to generate the indication of available bandwidth based on historical usage information.

86. The system of claim 44, wherein at least one virtual group includes a plurality of class of service queues, each virtual group further operable to individually control congestion for each of the class of service queues in the virtual group based on a dynamic status of the wireless network.

87. The system of claim 44, the dynamic flow manager further operable to assign a packet for a corresponding flow in a first location to a first virtual group associated with the first location and in response to the flow moving from the first location to a second location to assign a subsequent packet for the flow to a second virtual group associated with the second location.

88. The system of claim 87, further comprising a mobility manager operable to requeue the packet in the first virtual group into the second virtual group based on original queuing time for the packet.

89. A peripheral card for a mobile gateway, comprising:
an external interface operable to receive a stream of packets for transmission in a wireless network, each packet including a flow identifier uniquely identifying the flow;
a dynamic flow manager operable to determine for each packet based on the included flow identifier a location for a corresponding flow, wherein the location comprises at least one of a sector in the wireless network, a latitude and a longitude of a mobile device associated with the flow, and a specific beam within a sector of the wireless network, to assign each packet to one of a plurality of virtual groups based on the location for the corresponding flow, the virtual groups comprising discreet transmission resources; and
an internal interface operable to forward the packets to the assigned virtual groups for queuing.

90. The peripheral card of claim 89, the dynamic flow manager further operable to add a virtual group label to each packet identifying the assigned virtual group.

91. The peripheral card of claim 89, further comprising a dynamic bandwidth estimator operable to generate an indication of available bandwidth for each of the virtual groups.

* * * * *

UNITED STATES PATENT AND TRADEMARK OFFICE
CERTIFICATE OF CORRECTION

PATENT NO. : 6,865,185 B1  Page 1 of 1
APPLICATION NO. : 09/513912
DATED : March 8, 2005
INVENTOR(S) : Pulin R. Patel et al.

It is certified that error appears in the above-identified patent and that said Letters Patent is hereby corrected as shown below:

Column 22, Line 13, Claim 2, after "the" delete "a".
Column 23, Line 11, Claim 23, after "claim" delete "16" and insert -- 1 --.
Column 24, Line 38, Claim 45, after "for" delete "a".

Signed and Sealed this

Twenty-fifth Day of July, 2006

JON W. DUDAS
*Director of the United States Patent and Trademark Office*